United States Patent [19]

Takahashi et al.

[11] 4,238,851
[45] Dec. 9, 1980

[54] PACKET TRANSMISSION SYSTEM

[75] Inventors: Osamu Takahashi, Sagamihara; Isao Fudemoto, Ayase, both of Japan

[73] Assignee: Fujitsu Limited, KawasAki, Japan

[21] Appl. No.: 36,819

[22] Filed: May 7, 1979

[30] Foreign Application Priority Data

May 8, 1978 [JP] Japan .................................. 53-53776

[51] Int. Cl.³ .............................................. H04J 3/02
[52] U.S. Cl. ...................................................... 370/94
[58] Field of Search ........... 179/15 BA, 15 AT, 15 A,
179/15 BV, 15 AS; 370/94, 60, 92, 93

[56] References Cited

U.S. PATENT DOCUMENTS

| | | | |
|---|---|---|---|
| 3,403,383 | 9/1968 | Kienzle et al. ........................ | 364/200 |
| 3,790,715 | 2/1974 | Inose et al. ....................... | 179/15 AS |
| 3,935,391 | 1/1976 | Weir et al. ............................ | 179/15 A |
| 3,988,545 | 10/1976 | Kuemmerle et al. ........... | 179/15 BV |
| 4,048,447 | 9/1977 | Maruta ............................. | 179/15 AS |

*Primary Examiner*—Douglas W. Olms
*Attorney, Agent, or Firm*—Staas & Halsey

[57] ABSTRACT

In a packet transmission system in which a plurality of kinds of telephone signals are packetized and transmitted, when a voice signal call is originated, a real channel is established for the voice signal call prior to a signal call other than a voice signal call, so that a transmission channel is occupied in each frame. When the voice signal call is over, the transmission channel allocated to the voice signal call, is changed to a condition in which another call can be allocated thereto. The system is useful for effective utilization of a packet communication network, without impairing the transmission quality requirement for a voice signal call.

11 Claims, 71 Drawing Figures

| Fig. 2A | Fig. 2B |

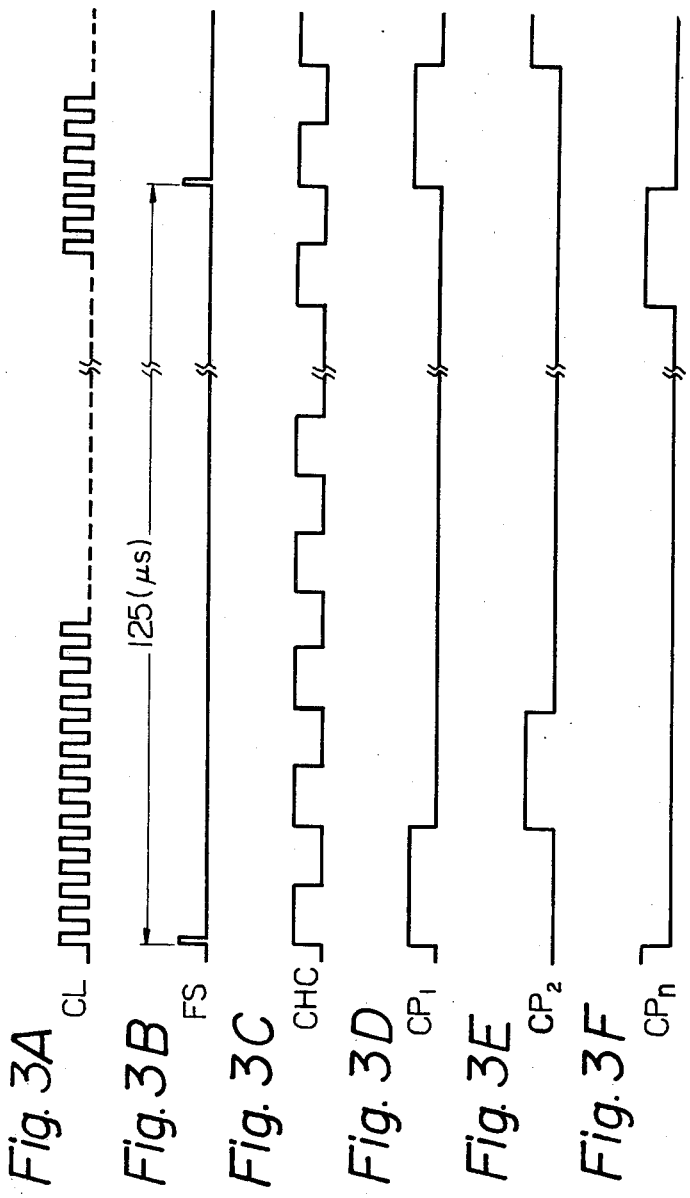

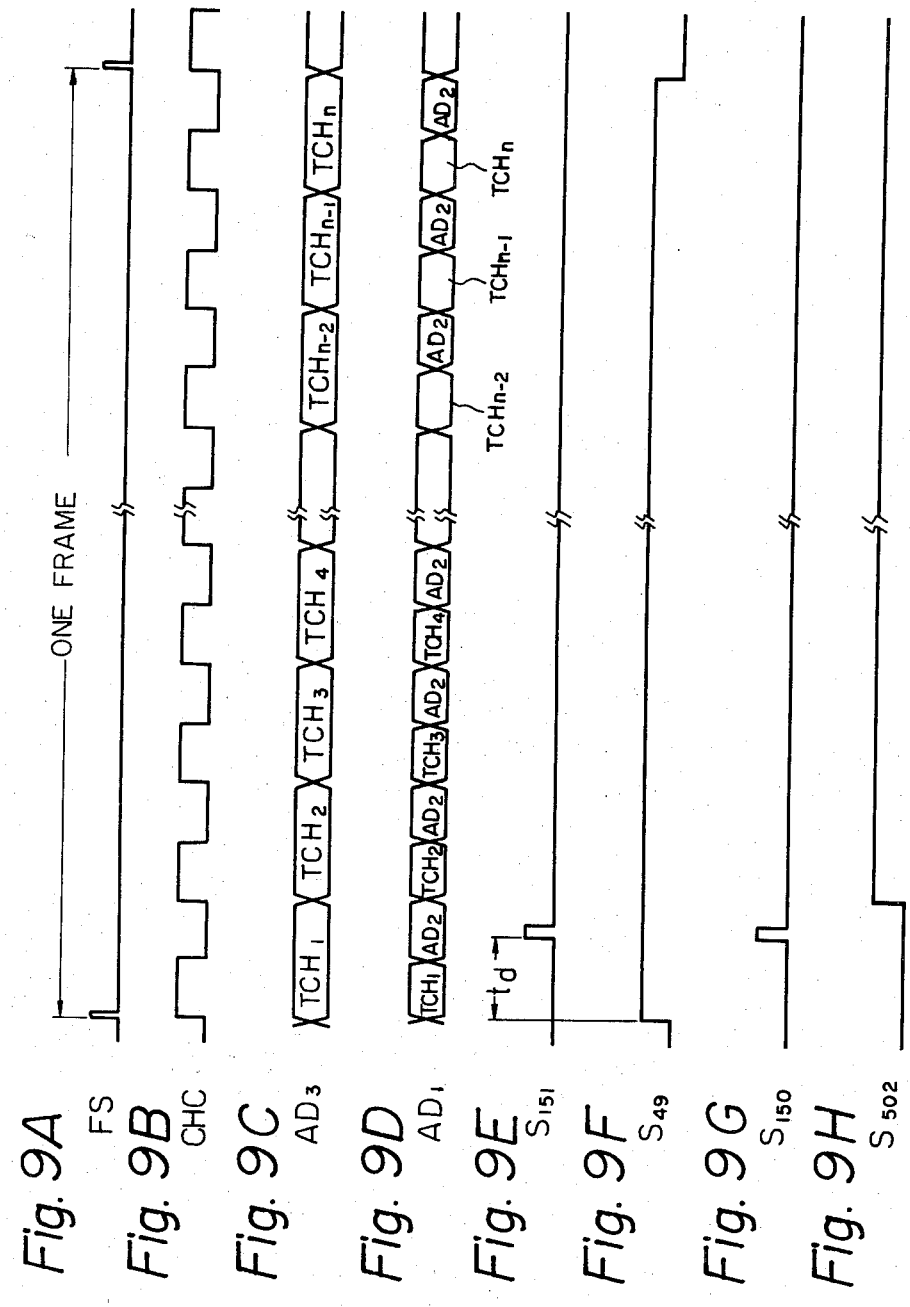

| Fig. 13A | Fig. 13B |

| Fig. 14 A | Fig. 14 B |

| Fig. 15A | Fig. 15B |

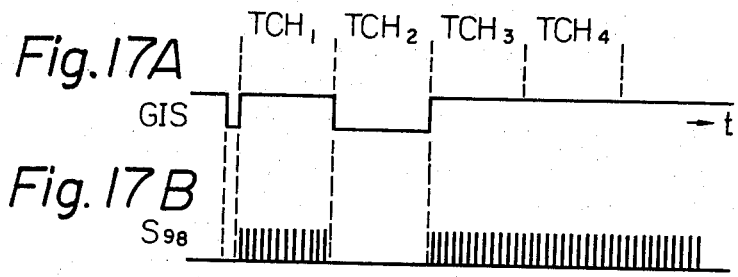
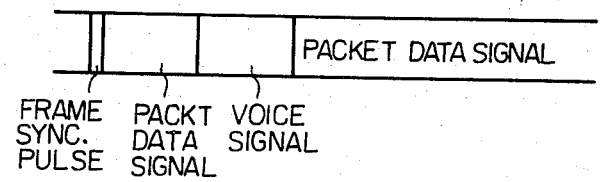
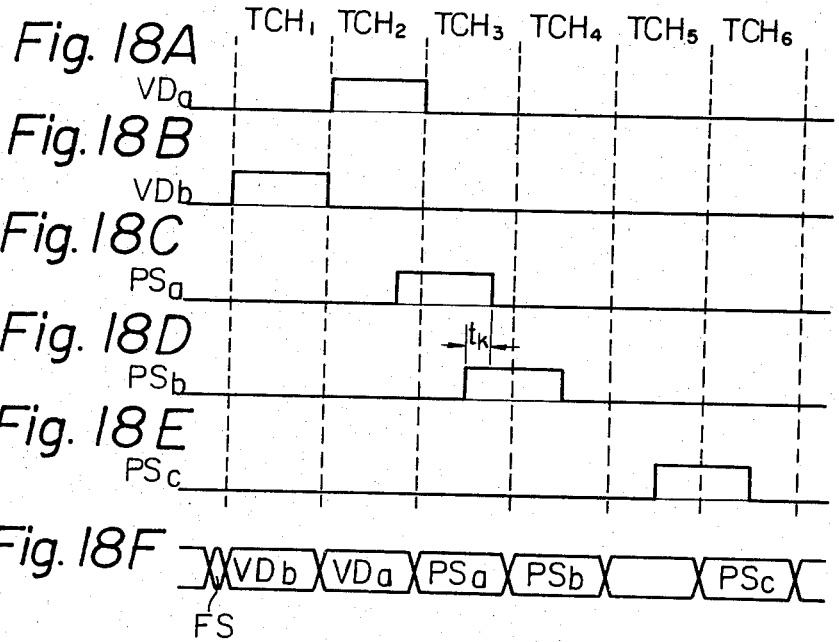

PACKET TRANSMISSION SYSTEM

BACKGROUND OF THE INVENTION

1. Field of the Invention

The present invention relates to a packet transmission system, more particularly, to a packet transmission system by which various data signals including voice data signals can be packet-transmitted at a high efficiency with desirable transmission quality.

2. Description of the Prior Art

The packet transmission system is known as one devised for effective utilization of a circuit. The packet transmission system attains a high efficiency of circuit utilization by allowing the transmission delay time to increase to a practically permissible limit. For this reason, in a case where various digital data signals, including a voice signal, are transmitted within a given packet-communication network, if a voice signal is packetized once, there is a disadvantage in that it is impossible to connect such a packetized voice signal to a circuit switching network.

A known technique to cope with the above mentioned disadvantage of the packet transmission system is to sort data signals to be transmitted into voice signals, which require more severely restricted transmission delay time, and other data signals, which have a transmission delay time which may be relatively large. These two kinds of signals are assigned respective separately fixed time slots, so that either kind of signal may be transmitted, so as to meet the required transmission delay time characteristic within the assigned time slot. However, the number of voice signal calls decreases at night, resulting in a lowering of the rate of utilization of the channel assigned to the data signals which have a restricted transmission delay time. Therefore, the above-mentioned known technique causes the rate of circuit occupation of the whole system to decrease, and fails to achieve effective utilization of the packet transmission system, thereby making the adoption of the packet transmission system impractical.

SUMMARY OF THE INVENTION

In a packet transmission system according to the present invention, wherein a plurality of kinds of telephone signals are packetized and transmitted, when a voice signal call is originated, the voice signal call is allocated to a predetermined address in each frame to occupy the address or the transmission channel prior to a call other than the voice signal call. To perform the above-mentioned allocating operation, a paticular call-origination signal is added in voice signal call to distinguish between the voice signal call and the data signal call. Therefore, the real channel is established for each voice signal call. On the other hand, when the voice signal call is disconnected from the input channel, the allocated transmission channel is released from the occupied status so that the released transmission channel is opened to any call.

An object of the invention is to provide a packet transmission system that is useful for effective utilization of a packet communication network.

Another object of the invention is to provide a packet transmission system wherein, when a voice signal call is originated, the voice signal can be transmitted in such a way as to maintain the transmission quality requirement.

Another object of the invention is to provide a packet transmission system wherein, when a voice signal call is originated the voice signal call is allocated to the same transmission channel in each of the transmission frames prior to a data signal, and a data signal call is transmitted as packet data by utilizing a time slot to which a voice signal is not allocated.

BRIEF DESCRIPTION OF THE DRAWINGS

The foregoing and other objects and features of the invention will become more readily apparent from the detailed description of the preferred embodiment of the present invention set forth below, with reference to the appended drawings, in which:

FIGS. 3A to 3F are waveforms of the signals from a clock pulse generator in FIG. 2;

FIGS. 9A to 9H are timing charts for explaining the operation of the connecting control circuit in FIG. 8;

FIGS. 17A to 17C and 18A to 18F are timing charts for explaining the operation of the transmitting device, and;

DESCRIPTION OF THE PREFERRED EMBODIMENT

Figure 1:
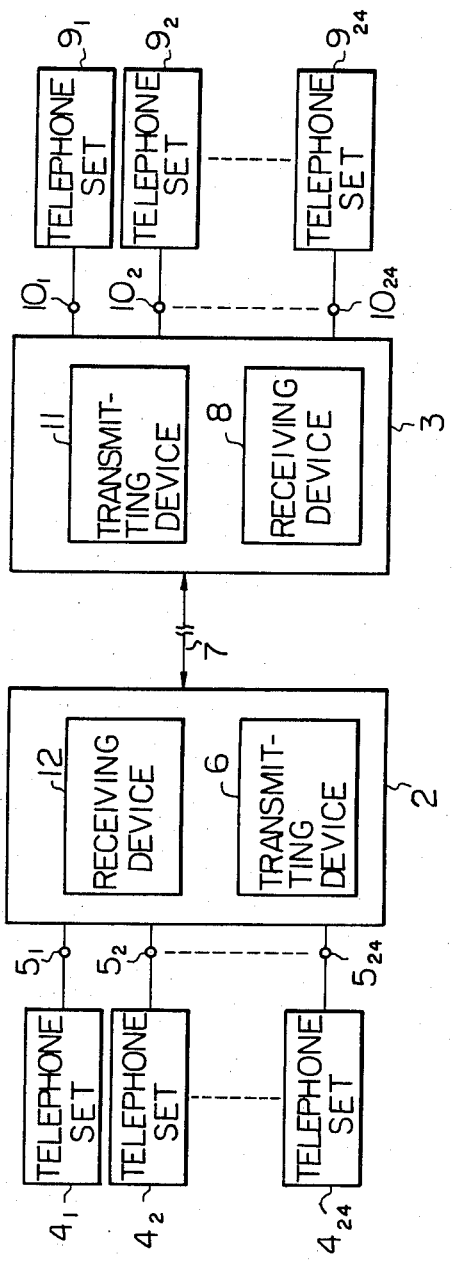
FIG. 1 is a general block diagram of a packet transmission system of the present invention.

Referring to FIG. 1, a packet transmission system 1, according to the present invention, has two stations 2 and 3, between which packet transmissions are carried out. The station 2 has a channel capacity of twenty-four channels and twenty-four telephone sets $4_1$ to $4_{24}$ are connected thereto through terminals $5_1$ to $5_{24}$, respectively. Transmitted signals from these telephone sets are multiplexed by using a transmitting device 6 and are transmitted to the station 3 through a transmission line 7. The multiplexed signals are received by a receiving device 8, of the station 3, which carries out the demultiplexing operation. The demultiplexed signals are respectively distributed to the predetermined ones of the telephone sets $9_1$ to $9_{24}$, which are connected to the station 3 through terminals $10_1$ to $10_{24}$. On the other hand, signals are transmitted from station 3 to station 2 by using a transmitting device 11 of the station 3, and are received by using a receiving device 12 of the station 2. As a result, bidirectional communication can be carried out between any one of telephone sets on the left side in FIG. 1 and any one of telephone sets on the right side in FIG. 1.

Although the transmitted signals supplied from telephone sets are voice signals, facsimile signals, or the like, a predetermined particular code is added to signals requiring more severely restricted transmission delay time, such as some kinds of voice signals, in order to identify those incoming signals from the telephone sets as signals requiring more severely restricted transmission deley time. In this embodiment, all the voice signals are required to be transmitted with a more severely restricted transmission delay time, and for signals other than voice signals there is no such transmission delay time limitation. Therefore, only voice signals from telephone sets have the predetermined paticular code. This predetermined particular code is provided in the dial number information of the voice signal in such a way that the first number of the dial number is zero. Therefore, it is easy to identify whether or not the signal to be transmitted is a voice signal by checking the dial number thereof.

When the voice signal call is originated at some terminal, e.g., an input channel, a real channel is established for the voice signal in such a way that the voice signal is allocated to the same transmission channel or address in each of the transmission frames. One transmission frame has n transmission channels. On the other hand, when the data signal call is originated at some terminal, the data signal is allocated in the form of conventional packet data to a time slot to which a voice signal is not allocated.

Since the operation in the case where the signal is transmitted from the station 3 to the station 2 is the same as the operation in the case where the signal is transmitted from the station 2 to the station 3, the detailed operation of the system 1 will be explained only for the case where the signal is transmitted from the station 2 to the station 3.

Figures 2, 2A:
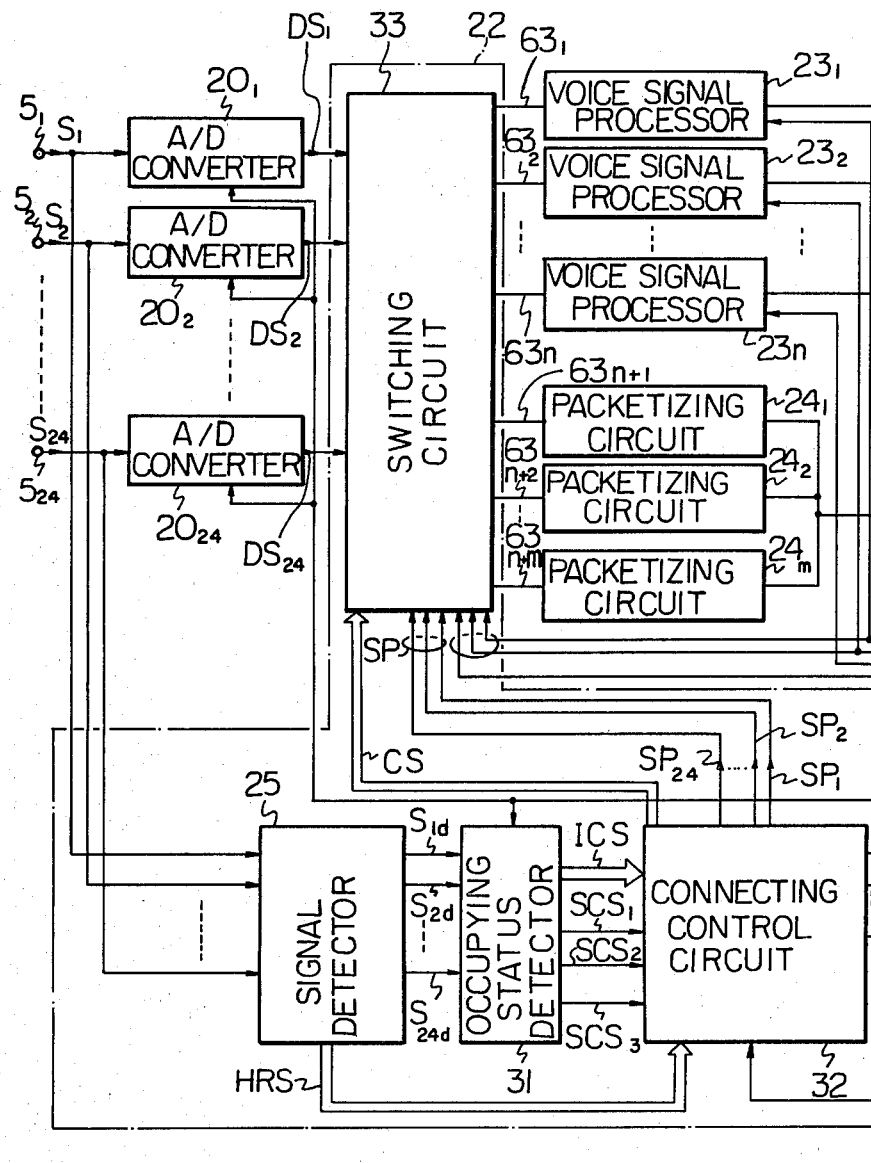
FIG. 2 (together with 2A & 2B) is a block diagram of a transmitting device in FIG. 1.
Figure 2B:
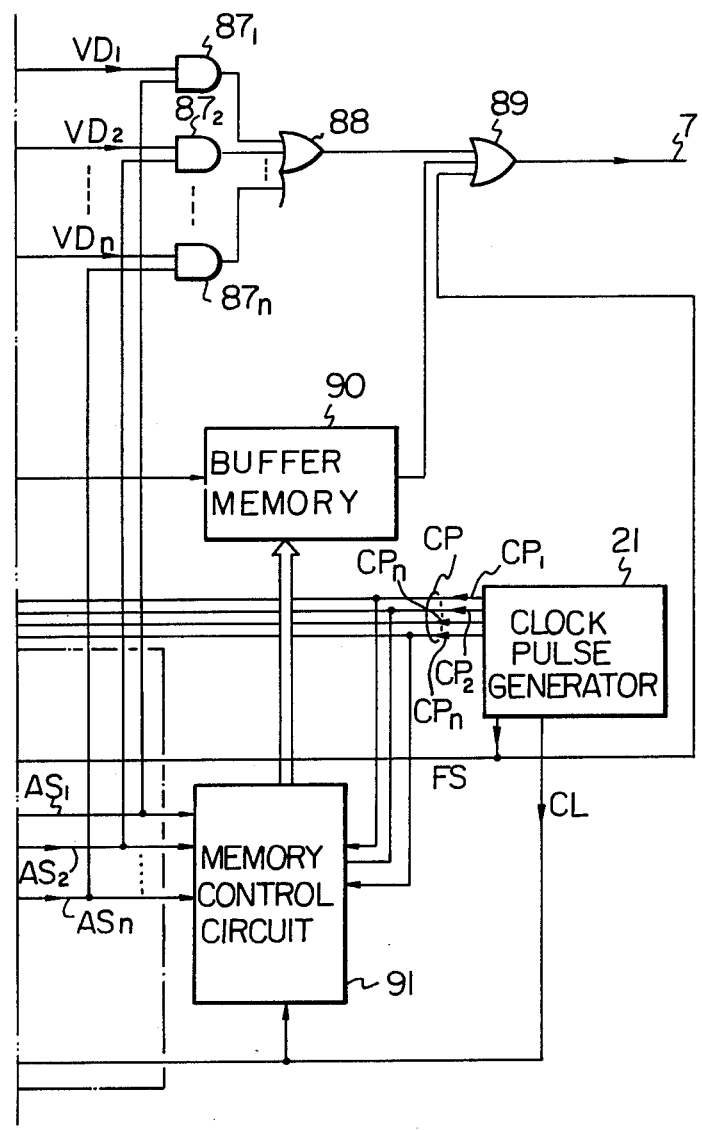

In FIG. 2, a block diagram of the transmitting device 6 in FIG. 1 is illustrated in detail. Referring to FIG. 2, the signals $S_1$ to $S_{24}$ from telephone sets $4_1$ to $4_{24}$ are applied to A/D converters $20_1$ to $20_{24}$, through the terminals $5_1$ to $5_{24}$, respectively, and are converted into digital form using a pulse code modulation (PCM) technique. To carry out these converting operations, a frame synchronization pulse signal FS from a clock pulse generator 21 is supplied to these A/D converters as sampling pulses. The clock pulse generator 21 generates a sending clock pulse signal CL with a constant period. A channel clock signal CHC, a group of channel pulse signals CP and the frame synchronization pulse signal FS are produced on the basis of the signal CL.

As shown in FIG. 3, the signal FS is a pulse train composed of pulses produced every 125 microseconds and having a predetermined pulse width. Each of these pulses defines a beginning of each frame. The signal FS is produced from the sending clock pulse signal CL by using a suitable frequency divider. The clock pulse generator 21 also produces the channel clock signal CHC, which has a frequency n times that of the frame synchronization signal FS and is synchronized with the signal FS as illustrated in FIG. 3.

In order to enable the establishment of a real channel for a voice signal when the voice signal call is originated, each frame is evenly divided into n channels. A group of channel pulses CP is composed of n channel pulses $CP_1$ to $CP_n$ which are used for selecting the timing of any one of the channels in each frame. In FIG. 2, only channel pulses $CP_1$, $CP_2$ and $CP_n$ are shown.

Referring back to FIG. 2, the transmitting device 6 has voice signal processors $23_1$ to $23_n$ for processing the incoming voice signals and packetizing circuits $24_1$ to $24_m$ for processing the incoming data signals other than voice signals. In order to apply the signals $DS_1$ to $DS_{24}$ to the voice signal processors or the packetizing circuits in accordance with the kind of signals $DS_1$ to $DS_{24}$, a selective connector 22 is provided. The selective connector 22 identifies whether or not the signal fed into each of the terminals $5_1$ to $5_{24}$ is a voice signal. The connector 22 supplies each of the signals $DS_1$ to $DS_{24}$, if the incoming signal is a voice signal, to an idle one of the voice signal processors or, if the incoming signal is a data signal, to an idle one of the packetizing circuits, thereby selecting and securing a channel suitable for the incoming signal. The selective connector 22 is provided with a signal detector 25 for detecting dial number information and for identifying which terminal receives a voice signal.

Figure 4:
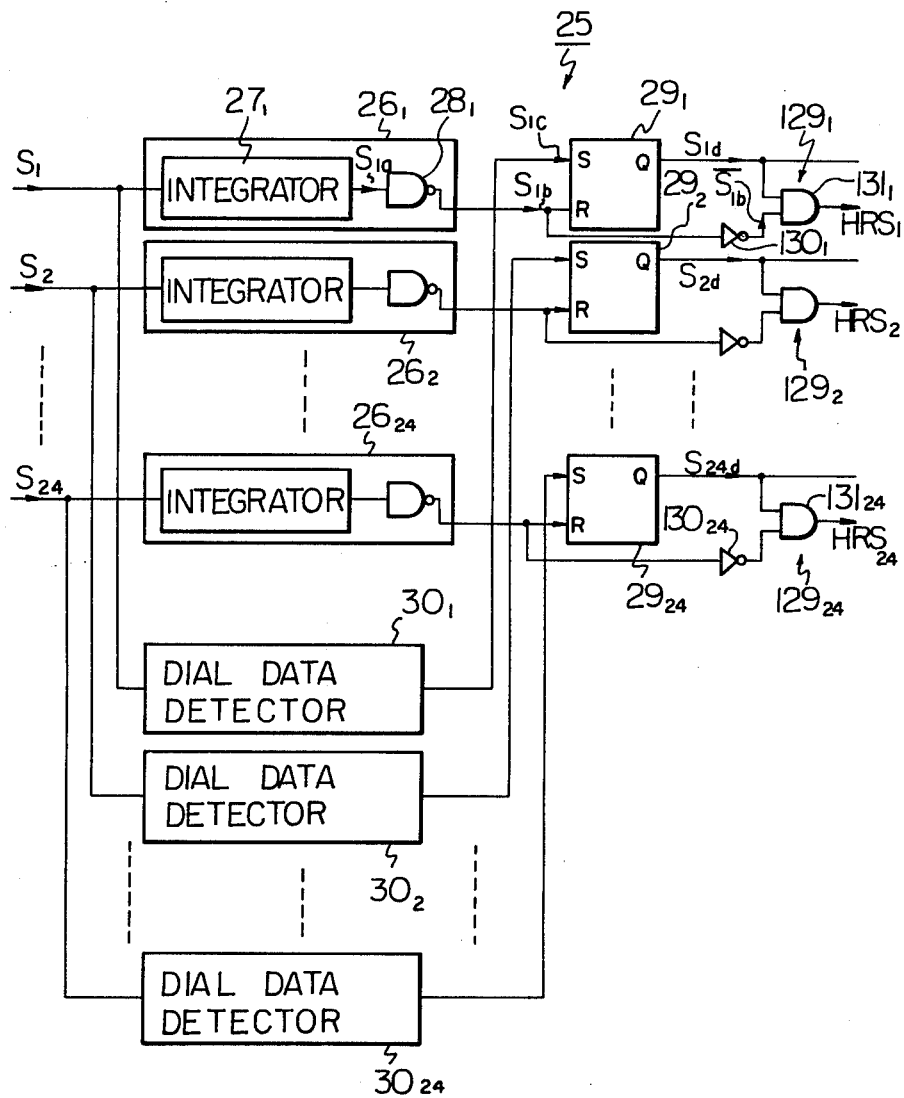
FIG. 4 is a detailed block diagram of a signal detector in FIG. 2.
Figure 5A:
FIGS. 5A to 5F are waveforms of the signals indicated in FIG. 4.
Figure 5B:
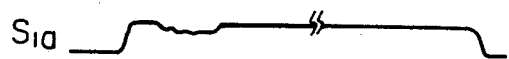
Figure 5C:
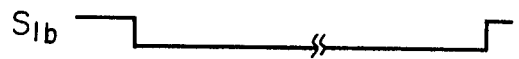
Figure 5D:
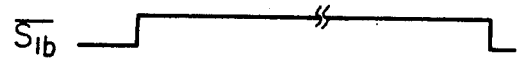
Figure 5E:
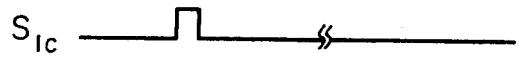
Figure 5F:
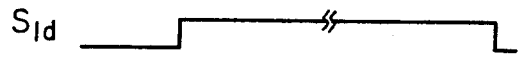

FIG. 4 is a detailed block diagram of the signal detector 25. The signal detector 25 is provided with hook-off detectors $26_1$ to $26_{24}$ corresponding to terminals $5_1$ to $5_{24}$. The hook-off detector $26_1$ has an integrator $27_1$ for integrating a loop signal produced when the hand-set is picked up, and an NAND gate $28_1$ to which the output signal from the integrator $27_1$ is applied. Other detectors $26_2$ to $26_{24}$ are also constructed in the same manner as the detector $26_1$. There is provided R-S flip flops $29_1$ to $29_{24}$ corresponding to hook-off detectors, and each output signal from the hook-off detector is applied to a reset terminal R of the R-S flip flop corresponding thereto. The signals $S_1$ to $S_{24}$ from terminals $5_1$ to $5_{24}$ are also respectively applied to dial-data detectors $30_1$ to $30_{24}$ corresponding to these terminals $5_1$ to $5_{24}$. Each dial-data detector has not only the functions of detecting the dial number information sent from the corresponding terminal, but also the function of producing a detection signal when the first number of the dial number is zero. These detection signals are applied to set terminals S of the R-S flip flops $29_1$ to $29_{24}$, respectively. Consequently, if the signal $S_1$ (FIG. 5A) from the telephone set $4_1$ is applied to the signal detector 25, the signal $S_1$, shown in FIG. 5, is integrated by the integrator $27_1$ to obtain integrated signal $S_{1a}$, shown in FIG. 5B. As the waveform of the integrated signal $S_{1a}$ is shaped by the NAND gate $28_1$, the output signal $S_{1b}$ is obtained from the hook-off detector $26_1$. The level of the signal $S_{1b}$ becomes low only when the hand set of the telephone set $4_1$ is in hook-off status. On the other hand, if the dial data detector $30_1$ detects the fact that the first number of the dial number is zero, the detector $30_1$ makes the level of set terminal S of the R-S flip flop $29_1$ high by the detection signal $S_{1c}$ over a short time. As a result, when the call originates at the terminal $5_1$, the R-S flip flop $29_1$ is set by the leading edge of the signal $S_{1c}$ (FIG. 5E), if the signal $S_1$ is a voice signal, and then, the R-S flip flop $29_1$ is reset by the leading edge of the signal $S_{1b}$. That is, the level of the output signal $S_{1d}$ from the flip flop $29_1$ is kept high from the time the zero in the first number of the dial number is detected to the time the loop signal becomes off. On the other hand, when the signal $S_1$ is not a voice signal, as the level of the signal $S_{1c}$ remains low, the signal $S_{1d}$ (FIG. 5F) is kept low from the time of the origination of the call to the time of the end of the call. All the flip flops $29_2$ to $29_{24}$ are operated in a manner similar to that of the flip flop $29_1$. Thus, the level of each of the output signals $S_{1d}$ to $S_{24d}$ becomes high when a voice signal is applied to the corresponding terminal.

In order to detect input channels to which data signals are connected, detecting circuits $129_1$ to $129_{24}$ are arranged so as to correspond to the signals $S_1$ to $S_{24}$, respectively. The detecting circuit $129_1$ comprises an inverter $130_1$ and an AND gate $131_1$. As one input terminal of the AND gate receives the signal $S_{1d}$ and the other input terminal of the AND gate receives the inverted signal $\overline{S_{1b}}$ (FIG. 5C), which is obtained by using the inverter $130_1$, the output level of the AND gate $131_1$ becomes high only when the input terminal $5_1$ receives the data signal. The output signals $HRS_1$ to $HRS_{24}$ from the AND gates $131_1$ to $131_{24}$ are applied to a connecting control circuit 32 (see FIG. 2).

Referring back to FIG. 2, the signals $S_{1d}$ to $S_{24d}$ are individually supplied to an occupying status detector 31 for detecting the assignment/release of the voice signal in each input channel or input terminal. An input channel status signal ICS, and status change signals $SCS_1$, $SCS_2$ $SCS_3$ are applied to the connecting control circuit 32 for controlling a switching circuit 33. To control the switching circuit 33 in such a way that the input channel to which a voice signal is applied is connected to an idle one of the voice signal processors and the input channel to which a data signal is applied is connected to an idle one of the packetizing circuits, the connecting control circuit 32 produces switching signals $SP_1$ to $SP_{24}$ and allocation status signals $AS_1$ to $AS_n$ on the basis of the signals from the occupying status detector 31, and also, produces a group of control signals CS on the basis of the signal HRS from the signal detector 25. The switching signals $SP_1$ to $SP_{24}$ and the channel pulses $CP_1$ to $CP_n$ are applied to the switching circuit 33.

Figure 6:
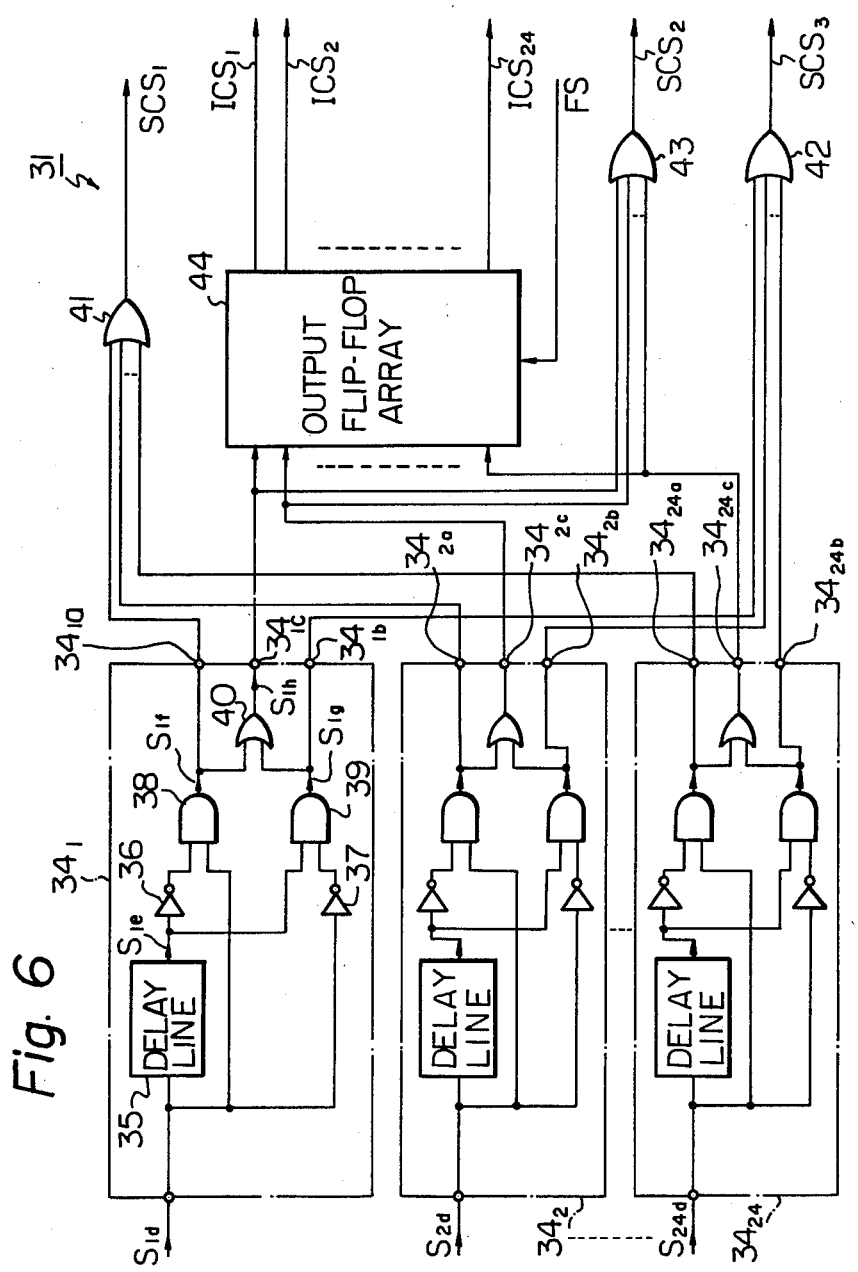
FIG. 6 is a detailed block diagram of an occupying status detector in FIG. 2.

In FIG. 6, the circuit diagram of the occupying status detector 31 is illustrated, and this detector 31 has change timing detectors $34_1$ to $34_{24}$ corresponding to output signals $S_{1d}$ to $S_{24d}$. The change timing detector $34_1$ has a delay line 35 for imparting a predetermined delay time to the output signal $S_{1d}$ (FIG. 7A), inverters 36, 37, AND gate 38, 39 and OR gate 40. A signal $S_{1e}$ (FIG. 7B) passing through the delay line 35 is applied to one input terminal of the AND gate 38 through the inverter 36. Since the signal $S_{1d}$ is also applied to the other input terminal of the AND gate 38, a signal $S_{1f}$ (FIG. 7C), representing the time when the level of the output signal $S_{1d}$ becomes high is obtained from AND gate 38. In a similar way, a signal $S_{1g}$ (FIG. 7D), representing the time when the level of the output signal $S_{1d}$ becomes low is obtained from AND gate 39. The signals $S_{1f}$, and $S_{1g}$ are applied to each input terminal of the OR gate 40 to obtain a signal $S_{1h}$ (FIG. 7E) representing the time when the level of the signal $S_{1d}$ becomes high (referred to hereinafter as time of the leading-edge) and the time when the level of the signal $S_{1d}$ becomes low (referred to hereinafter as time of the trailing-edge). As will be understood from the foregoing description, the time of the leading-edge indicates the time when the voice signal call is connected to the input channel and, on the other hand, the time of the trailing-edge indicates the time when the voice signal call is disconnected from the input channel. The signals $S_{1f}$, $S_{1g}$ and $S_{1h}$ are derived from output terminals $34_{1a}$, $34_{1b}$ and $34_{1c}$, respectively. The construction of other change timing detectors $34_2$ to $34_{24}$ is the same as that of the detector $34_1$. All of the signals derived from the output terminals $34_{1a}, 34_{2a}, \ldots 34_{24a}$ are applied to input terminals of an OR gate 41, respectively; all of the signals derived from the output terminals $34_{1b}, 34_{2b}, \ldots 34_{24b}$ are applied to input terminals of an OR gate 42, respectively; and; all of the signals derived from the output terminals $34_{1c}, 34_{2c}, \ldots 34_{24c}$ are applied to input terminals of an OR gate 43, respectively. As a result, if a voice signal is applied to any input channel or any terminal of terminals $5_1$ to $5_{24}$, following receipt of such a signal, timing pulses are produced from the outputs of the OR gates 41 and 43. If a voice signal is disconnected from any input channel, upon disconnecting, timing pulses are produced from the output of the OR gates 42 and 43. These timing pulses are output as the signals $SCS_1$, $SCS_2$ and $SCS_3$. The signals from the terminals $34_{1c}, 34_{2c}, \ldots 34_{24c}$ are applied to an output flip flop array 44 which has twenty-four flip flops corresponding to these signals. The frame synchronization signal FS (c.f. FIG. 3) is applied to the output flip flop array 44 as latch pulses. Therefore, the contents of the signals from the terminal $34_{1c}, 34_{2c}, \ldots 34_{24c}$ are obtained as signals $ICS_1$ to $ICS_{24}$ in synchronization with the timing of the frame synchronization pulse signal FS. p Referring now to FIG. 8, in which a block diagram of the connecting control circuit 32 is illustrated, the connecting control circuit 32 has a code converter 45 to which the signals $ICS_1$ to $ICS_{24}$ are applied. The code converter 45 produces a binary signal of 5-bits which represents the number of the input channel to which a voice signal call is connected or from which such a call is disconnected on the basis of the signals $ICS_1$ to $ICS_{24}$. Therefore, for example, since the level of the signal $ICS_1$ becomes high when a voice signal call is originated at the terminal $5_1$, the 5-bit binary signal $D_1$ is $(00001)_1$. On the other hand, the signal $SCS_1$ is applied to each one input terminal of AND gates $46_1$ to $46_{24}$ through a delay line 47, and the signals $SCS_3$ and $SCS_2$ are applied to D input terminals of D type flip flops 48 and 49, respectively. The flip flops 48 and 49 are adapted to hold the signals $SCS_3$ and $SCS_2$ by applying the frame synchronization signal FS to the clock terminals of the flip flops 48 and 49. A Q output from the flip flop 49 is applied to one input terminal of an AND gate 150, the output of which is applied to a random access memory (RAM) 50. To the other input terminal of the AND gate 150, the signal FS is applied through a delay line 151. The 5-bit binary signal $D_1$ applied to the RAM 50 in parallel through gates $51_1$ to $51_5$, is stored in the RAM 50 when the output of the AND gate 150 is high. When the output level of the AND gate 150 is low, the RAM 50 operates in the read-out mode. In the storing and reading-out operation of the RAM 50, the address of the RAM 50 is designated by address data $AD_1$ from a multiplexer (MPX) 52, to which address data $AD_2$ from a code converter 53 and address data $AD_3$ from an address counter $53_a$ are applied. The address data $AD_3$ is obtained by counting the channel clock signal CHC, by using the address counter $53_a$, and is an address scan signal which designates the transmission channel addresses 1 to n in sequence per one frame, as illustrated in FIGS. 9A and 9B. On the other hand, the code converter 53 is composed of a read only memory (ROM), to which the allocation status signals $AS_1$ to $AS_n$ are applied. The allocation status signals $AS_1$ to $AS_n$ are derived from a status register 54 which is composed of R-S flip flops $55_1$ to $55_n$, corresponding to n transmission channels $TCH_1$ to $TCH_n$ provided in each frame. Although described in detail hereinafter, generally speaking, the flip flop $55_i$ is set when the voice signal call is originated at any terminal and the call is allocated to the transmission channel $TCH_i$. The code converter 53 composed of a read only memory (ROM), converts the signals $AS_1$ to $AS_n$ to 5-bit binary data which represents the smallest numbered transmission channel in the transmission channels which have not yet been allocated to any voice signals. The 5-bit binary data is applied to the multiplexer 52 as the address data $AD_2$. The multiplexer 52 selectively and alternatively derives either the address data $AD_2$ or $AD_3$. The alternative selecting operation is carried out by the application of the signal CHC to the multiplexer 52. As shown in FIGS. 9B to 9D, the address data $AD_2$ is selected as the address data $AD_1$ when the level of the signal CHC is low, while the address data $AD_3$ is selected as the address data $AD_1$ when the level of the signal CHC is high. The address data $AD_2$ is also applied to a code converter 56, which has n output lines $56_1$ to $56_n$. Each of the output lines $56_1$ to $56_n$ is connected to each of the other input terminals of the AND gates $46_1$ to $46_n$. The code converter 56 operates in such a way that only the level of the output line designated by the suffix number of the same number that is represented by the address data $AD_2$ becomes high. As a result, the other input terminal of the AND gate corresponding to the flip flop in the status register 54, the suffix number of this flip flop being the same number as the smallest channel number in the transmission channels which have not yet been allocated to any voice signals, is at the high level. The output terminals of the AND gates $46_1$ to $46_n$ are connected to the set terminals S of the flip flops $55_1$ to $55_n$ respectively, so that the flip flop corresponding to the output line of the code converter 56 is set when the signal $SCS_1$ is applied to each AND gate $46_1$ to $46_n$ through the delay line 47. Therefore, when a call for the voice signal is originated at any one input terminal or input channel, the Q output of the flip flop 49 becomes high, so that the output level of the AND gate 150 becomes high at the time of a high level of a gate signal $S_{151}$, which is obtained from the delay line 151. As seen from FIG. 9E, the delay time $t_d$ is adjusted in such a way that the signal $S_{151}$ becomes high within the time when the multiplexer 52 selects the address data $AD_2$. Therefore, since the signal $S_{150}$ (FIG. 9G) becomes high at the same time the signals $S_{151}$ and $S_{49}$ are high, the RAM 50 is operated in the write-mode, so that the data from the AND gates $51_1$ to $51_5$ is written in the RAM 50 in accordance with the address data $AD_2$. In this case, since the level of the output of an AND gate 57 is low, due to the low level of the Q output of the flip flop 48, the 5-bit binary signal $D_1$ is applied to the RAM 50 through each of the gates $51_1$ to $51_5$ as the write data. Then, the binary signal $D_1$ is written in the RAM 50 in accordance with the address data $AD_2$, which is applied to the RAM 50 as address data $AD_1$. After such storing operation, the flip flop corresponding to the transmission channel allocated to the input channel in the status register 54, is set by the output of the code converter 56 and the output from the delay line 47 as described above. In this case, the delay time $t_x$ of the delay line 47 is determined to be larger than that of delay line 151, as seen from comparing the waveform of the signal $S_{151}$ with the waveform of the signal $S_{502}$ from the delay line 47 (FIG. 9H). Therefore, the reset operation in the status register 54 is carried out after the storing operation of the RAM 50.

When a voice signal call is disconnected from the input terminal, since the signals $SCS_1$ and $SCS_2$ are high, the Q outputs from the flip flops 48 and 49 become high, so that the signal $D_1$ is stored in a flip flop array 58 due to the high level of the Q output of the flip flop 48. Then, the RAM 50 is operated in the writing mode, due to the high level of the signal $S_{150}$. The output data signal $D_1$ from the flip flop array 58 is compared with the read-out data $D_2$ in a comparator 59. By the application of the address data $AD_3$ to the RAM 50, all the contents of the RAM 50 is swept out within one frame time, and all the outputs from the gates $51_1$ to $51_5$ become low, due to the output level of the comparator 59, when the signal $D_1$ is coincident with the data $D_2$. At this time, the data $(00000)_2$ is stored in the RAM 50 in accordance with the address designated by the address data $AD_3$ of this time. The address data $AD_3$ is applied to a code converter 60, which is constructed in the same manner as the code converter 56. Therefore, in accordance with the contents of the address data $AD_3$, only one output line of the output lines $60_1$ to $60_n$ of the code converter 60 becomes high. These output lines $60_1$ to $60_n$ are connected to the reset terminals R of the flip flops $55_1$ to $55_n$ through AND gates $61_1$ to $61_n$, respectively. Since one input terminals of the AND gates $61_1$ to $61_n$ are commonly connected to the output of the AND gate 57, these AND gates $61_1$ to $61_n$ are open only when the Q output of the flip flop 48 and the output of the comparator 59 are high. As a result, in the case, when the signal $D_1$ is coincident with the data $D_2$, in the status register 54, the flip flop having a suffix number which is the same number as the content of the address data $AD_3$ at this time, is reset.

As will be understood from the above-mentioned explanation, the connecting control circuit 32 operates as follows. When a voice signal call is originated, the transmission channel to which no voice signal is allocated is found, and the level of the allocation status signal corresponding to the found transmission channel is made high. On the other hand, when the voice signal call is disconnected from the input channel, the level of the allocation status signal corresponds to the transmission channel to which the call is allocated is made low. As a result, it is possible to find which transmission channel is allocated to a voice signal by the status level of the allocation status signals $AS_1$ to $AS_n$.

The circuit 32 also has a decoder 65 for decoding the data $D_2$ read-out from the RAM 50, and the decoder 65 has n output lines $65_1$ to $65_n$. When the data $D_2$ is applied to the decoder $65_1$ the output line thereof, having a suffix number which is the same number as the content of the data $D_2$, is at a high level. Therefore, for example, in the case where the input channel x is allocated to the transmission channel y, when the content of the address data $AD_3$ is y, the data $D_2$ is x. Therefore, the level of the signal $SP_x$ becomes high.

The numerical reference 152 s a decoder to which the signal HRS is applied. The decoder 152 converts the signal HRS to a control signal CS which is used to control the switching circuit 33. That is, the data signals from the input terminals are respectively connected to the packetizing circuits by the switching circuit 33 and the decoder 152.

Figure 10A:
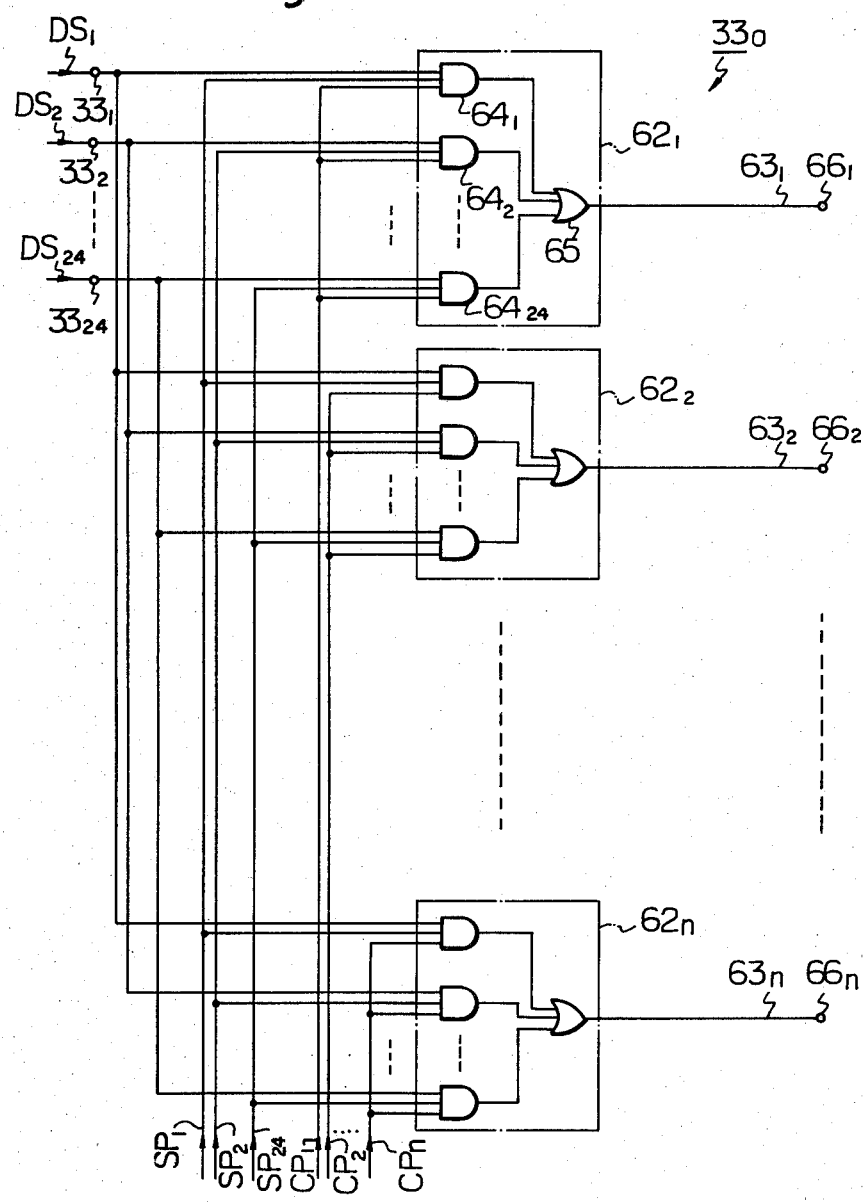
FIGS. 10A and 10B are circuit diagrams of a switching circuit in FIG. 2.
Figure 10B:
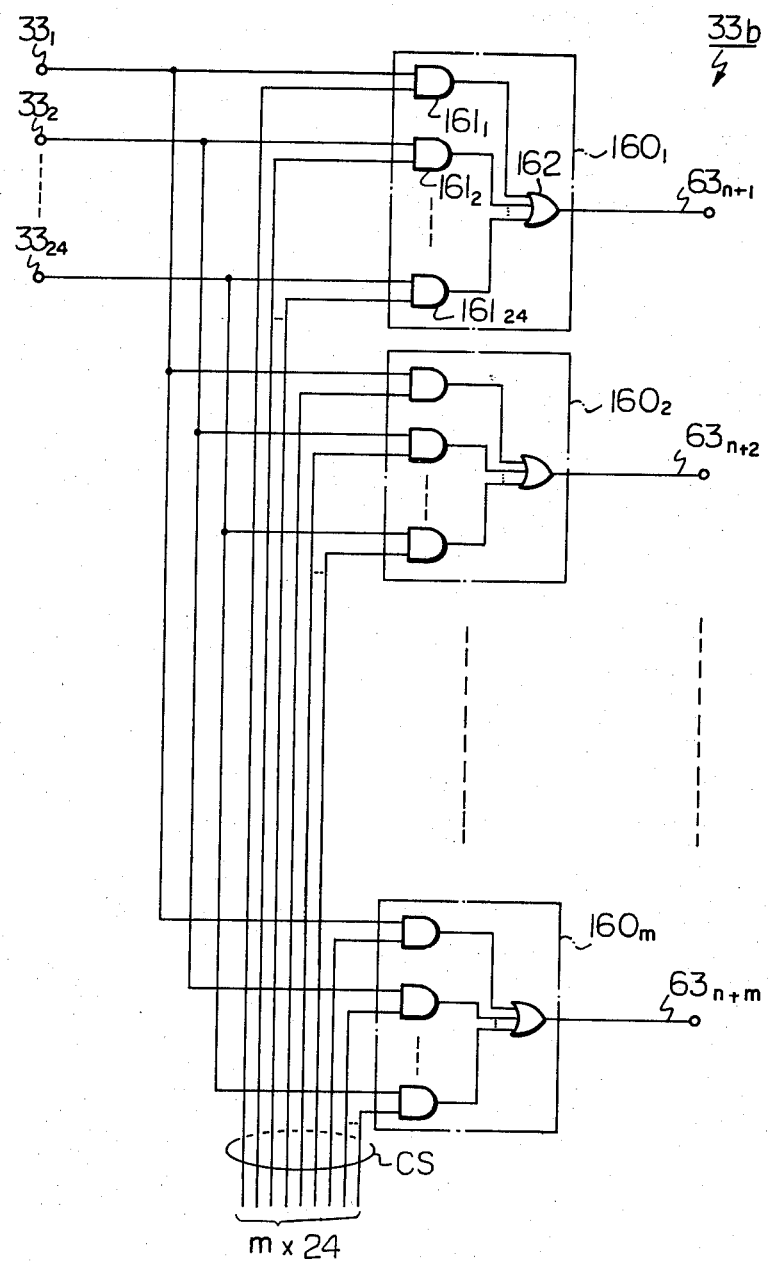

In FIGS. 10A and 10B, a circuit diagram of the switching circuit 33 is shown. The switching circuit 33 is composed of a voice switching circuit portion 33a and a data switching circuit portion 33b. The voice switching circuit portion 33a is the circuit for switching the voice signal to any one of the voice signal prosessors, and it has n switching blocks $62_1$ to $62_n$ corresponding to output lines $63_1$ to $63_n$. The switching block $62_1$ has AND gates $64_1$ to $64_{24}$ corresponding to input terminals $33_1$ to $33_{24}$, and an OR gate 65 to which the outputs of the AND gates $64_1$ to $64_{24}$ are applied. In these AND gates $64_1$ to $64_{24}$, each first input terminal receives each signal $DS_1$ to $DS_{24}$, each second input terminal receives each signal $SP_1$ to $SP_{24}$, and all the third input terminals receive the signal $CP_1$. Other switching blocks $62_2$ to $62_n$ are constructed in the same way as that of the switching block $62_1$, except that the third input terminals of the AND gates thereof do not receive the signal $CP_1$, but receive the signals $CP_2$ to $CP_n$, respectively. Therefore, with the voice switching circuit portion 33a, since each of the channel pulses $CP_1$ to $CP_n$ makes operable any one switching block of the switching blocks $62_1$ to $62_n$ and each of the switching signals $SP_1$ to $SP_{24}$ makes operable any one AND gate of the AND gates $64_1$ to $64_{24}$ in every switching block, the incoming digital voice signals are exchanged between the input terminals $33_1$ to $33_{24}$ and the output terminal $66_1$ to $66_n$ in accordance with the registered contents in the RAM 50. Therefore, in the case of the above mentioned example, since the level of the signal $SP_Y$ becomes high when the level of the signal $CP_Y$ is high, it follows that the voice signal $DS_x$ applied to the input terminal $33_x$ is derived from the output terminal $66_y$. Thus, the voice switching circuit portion 33a can be operated so as to connect each of the incoming digital voice signals to any one output terminal of the terminals $66_1$ to $66_n$ in accordance with the resultant allocation decided by the connecting control circuit 32.

On the other hand, the data switching circuit portion 33b has m switching blocks $160_1$ to $160_m$ corresponding to output lines $63_{n+1}$ to $63_{n+m}$. The switching block $160_1$ has AND gates $161_1$ to $161_{24}$ corresponding to input terminals $31_1$ to $31_{24}$, and an OR gate 162 to which the outputs of the AND gates $161_1$ to $161_{24}$ are applied. The signal $DS_1$ to $DS_{24}$ is applied to one of the input terminals of the AND gates $161_1$ to $161_{24}$, respectively. Other switching blocks $160_2$ to $160_m$ are constructed in the same manner as that of the switching block $160_1$. To the other input terminals of the AND gates in these switching blocks $160_1$ to $160_m$, the signal CS is applied, and then, the data signals applied to these input terminals are respectively distributed to the packetizing circuits which are connected to the output lines $63_{n+1}$ to $63_{n+m}$. That is, the conventional concentrator is constructed by using the circuit portion 33b and the decoder 152. Such a concentrator for the above described purpose is well known. For example, the decoder can be realized by using a ROM (read only memory), in which the signal HRS is applied thereto as the address data, a group of signals for controlling the AND gates in the circuit portion 33b are sorted therein and these sorted signals can be read out in accordance with the contents of the signal HRS.

As seen from FIG. 2, the output lines $63_1$ to $63_n$ are respectively connected to input terminals of the voice signal processors $23_1$ to $23_n$, and the output lines $63_{n+1}$ to $63_{n+m}$ are respectively connected to each input of the packetizing circuit $24_1$ to $24_m$. Therefore, the voice signal call coming from the input terminals is allocated to any one transmission channel of the transmission channels 1 to n, that is, is applied to any one of the output terminals $63_1$ to $63_n$. Thus, the voice signal calls are applied to the voice signal processors $23_1$ to $23_n$. On the other hand, the data signal calls are suitably applied to the packetizing circuits $24_1$ to $24_m$. The number of the voice signal processors and the number of packetizing circuits can be decided so as to attain the most efficient and economical communication system.

Figure 7:
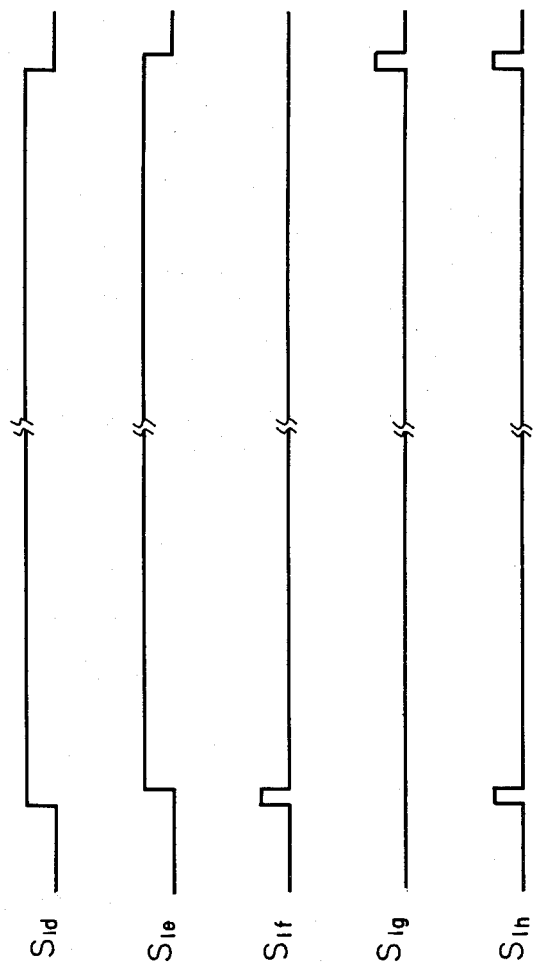
FIGS. 7A to 7E are waveforms of the signals indicated in FIG. 6.
Figures 8, 8A:
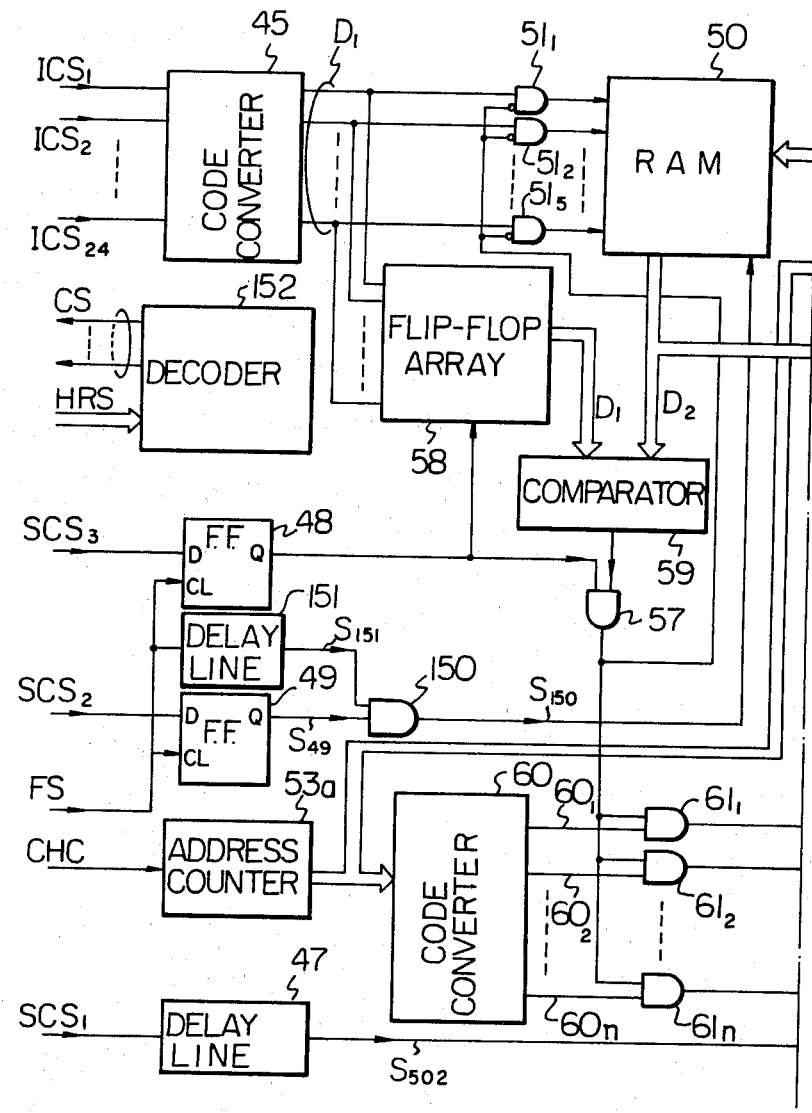
FIG. 8 (together with 8A & 8B) is a detailed block diagram of a connecting control circuit in FIG. 2.
Figure 8B:
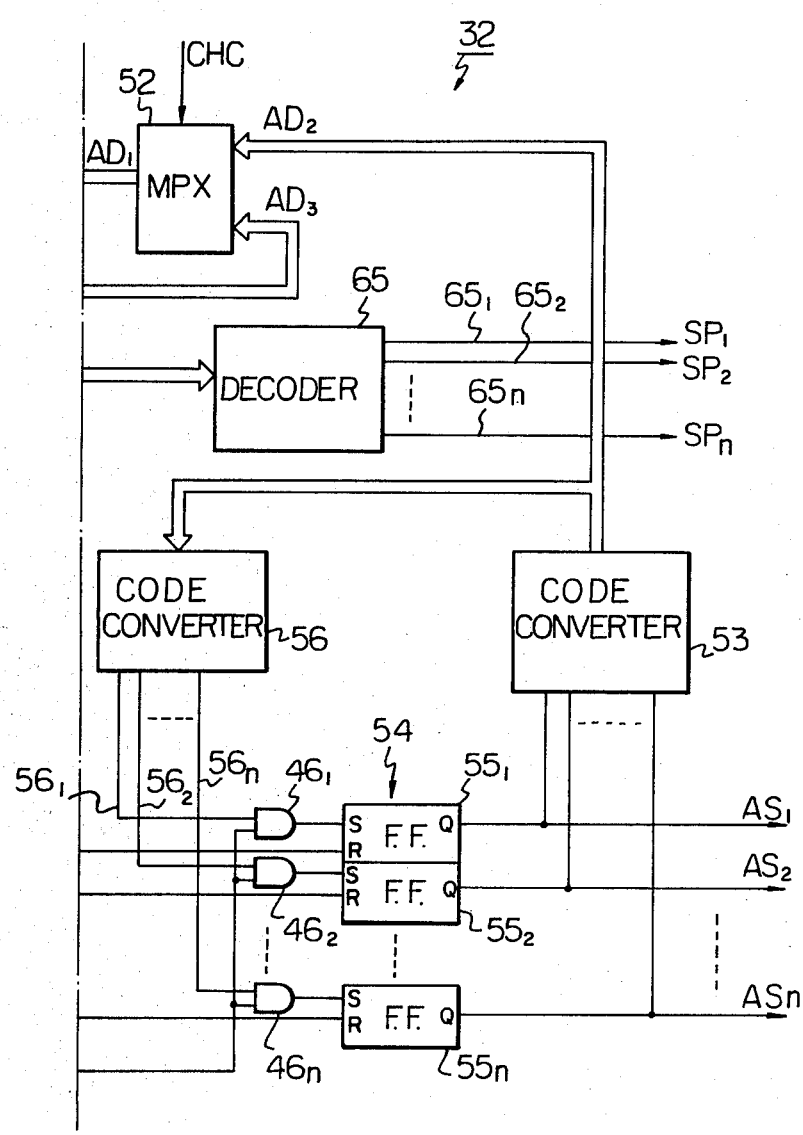
Figure 11:
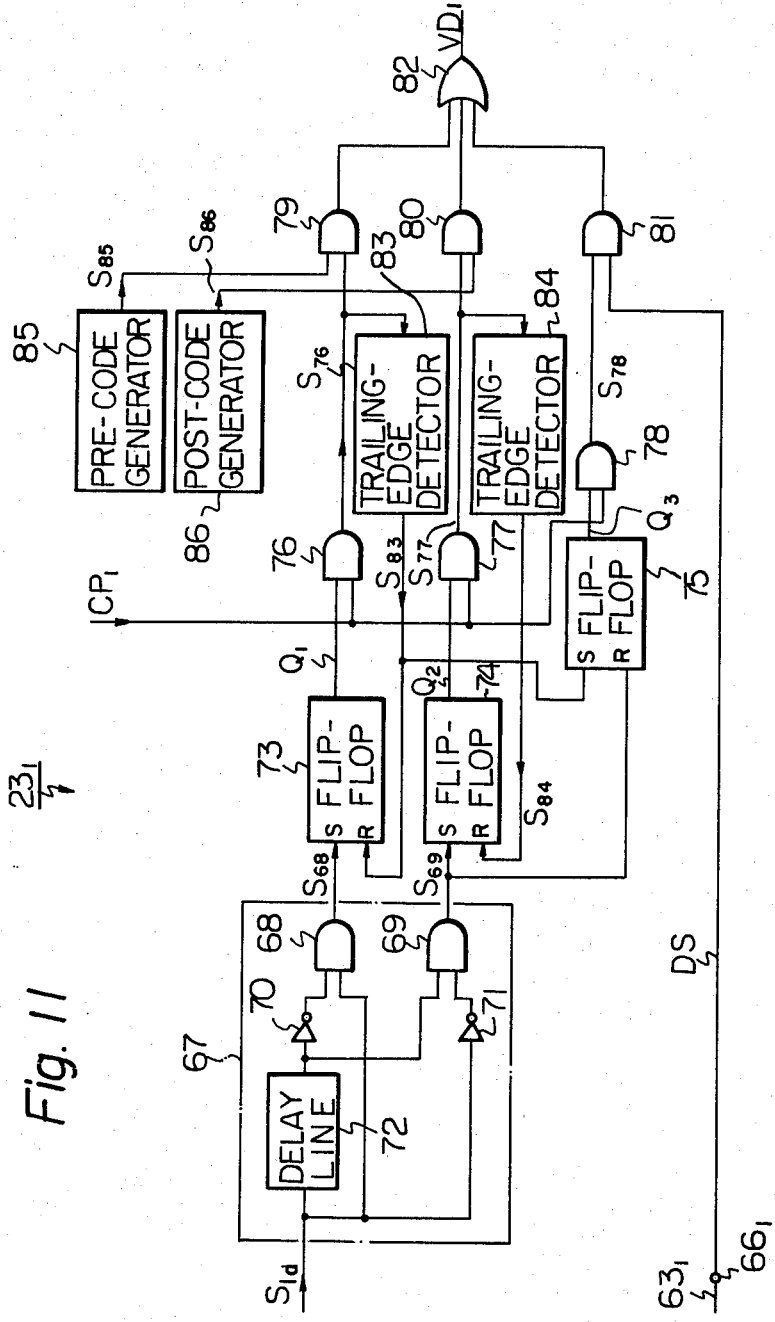
FIG. 11 is a detailed block diagram of a voice signal processor in FIG. 2.

FIG. 11 is a block diagram of the voice signal processor $23_1$, which has a timing detecting circuit 67 composed of AND gates 68 and 69, inverter 70 and 71, and a delay line 72. The signal $S_{1d}$ from the signal detector 25 is applied to the circuit $67_1$ and the same signal as the signal $S_{1f}$ shown in FIG. 7 is obtained from the AND gates 68. On the other hand, from the AND gate $69_1$ the same signal as the signal $S_{1g}$ is obtained. Since the operation of the circuit 67 is the same as that of the change timing detector $34_1$, the detailed explanation of the operation of the circuit 67 is omitted here. In the circuit $23_1$, reference numerals 73, 74 and 75 denote R-S flip flops, 76, to 81 denote AND gates, 82 denotes an OR gate, and 83 and 84 denote trailing-edge detectors. The trailing-edge detector 83 is a circuit for detecting the timing when the output level of the AND gate 76 changes from high to low, and the trailing-edge detector 84 is a circuit for detecting the timing when the output level of the AND gate 77 changes from high to low. A pre-code generator 85 is a special 8-bit code generator producing a pre-code of (11111111), which represents the start of sending the voice signal. A post-code generator 86 is a special 8-bit code generator producing a post-code of (00000000), which represents the end of sending the voice signal.

Figure 12:
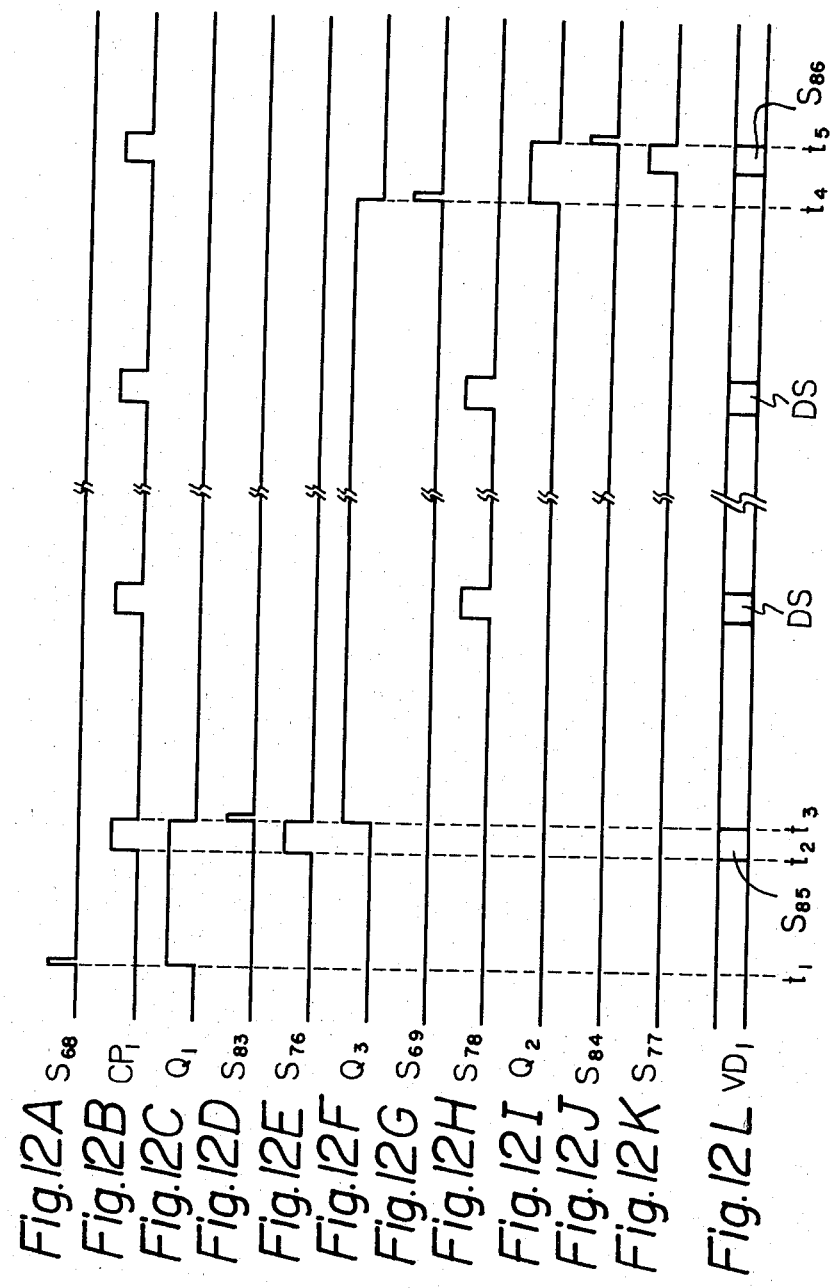
FIGS. 12A to 12L are timing charts for explaining the operation of the voice signal processor in FIG. 11.

The operation of the voice signal processor $23_1$ will now be described with reference to FIGS. 11 and 12. In the initial condition, all the flip flops are in the reset condition, so that an output $Q_1$ of the flip flop 73, an output $Q_2$ of the flip flop 74 and an output $Q_3$ of the flip flop 75 are at a low level. When the output signal $S_{68}$ from the AND gate 68 becomes high level at the time $t_1$ in FIG. 12, the flip flop 73 is set so that the level of the output $Q_1$ becomes high and the level of one input terminal of the AND gate 76 is high. In this condition, when the channel pulses $CP_1$ become high at the time $t_2$, the level of the output signal $S_{76}$ from the AND gate 76 becomes high. Then, when the level of the channel pulse $CP_1$ becomes low at the time $t_3$, at the same time, the level of the output signal $S_{76}$ also becomes low, so that the trailing-edge detector 83 produces a detection pulse $S_{83}$ to reset the flip flop 73. Thus, since the output $Q_1$ is kept low, the channel pulses $CP_1$ can not pass through the AND gate 76. As the detection pulse $S_{83}$ is also applied to a set terminal S of the flip flop 75, at the time $t_3$, the flip flop 75 is set so that the output $Q_3$ becomes high. As a result, after the time $t_3$, the channel pulses $CP_1$ can be supplied to one input terminal of the AND gate 81 through the AND gate 78, so that the voice signal DS from the terminal 61, is permitted to pass through the AND gate 81. When the output signal $S_{69}$ from the AND gate 69 becomes high level at the time $t_4$ at the each of the call, the flip flop 75 is reset and the flip flop 74 is set. Consequently, the AND gate 78 is closed and the AND gate 77 is open due to the high level condition of the output $Q_2$. Since the trailing-edge detector 84 is connected between the output of the AND gate 77 and the reset terminal R of the flip flop 74, when the channel pulses $CP_1$ becomes low at the time $t_5$, the flip flop 74 is reset by the application of a detection pulse $S_{84}$. Therefore, only one pulse of the channel pulses $CP_1$ is obtained from the AND gate 77 as an output signal $S_{77}$ after the time $t_4$.

As will be understood from the above description, at first, the pre-code data $S_{85}$ is output from the OR gate 82 during the time slot between $t_2$ and $t_3$, and then, the data of the voice signal applied to the terminal $66_1$ is output from the OR gate 82 during the time slot for an transmission channel $TCH_1$. When the call is disconnected from the input channel to produce the signal $S_{69}$, the post-code data $S_{86}$ is output from the OR gate 82 during the time slot between $t_4$ and $t_5$. The associated signal from the OR gate 82 is referred to as a data $VD_1$ hereinafter.

Other voice signal processors $23_2$ to $23_n$ have the same construction so that of the voice signal processor $23_1$ and, therefore, detailed explanations thereof are omitted here.

Referring back to FIG. 2, the transmitting device 6 has AND gates $87_1$ to $87_n$, corresponding to the voice signal processors $23_1$ to $23_n$, respectively, and the signals $VD_1$ to $VD_n$ are applied to an input terminal of the AND gates $87_1$ to $87_n$, respectively. The other input terminal of the AND gates $87_1$ to $87_n$ receives the allocation status signals $AS_1$ to $AS_n$, respectively, as indicated in FIG. 2. Since only the allocation status signal corresponding to the transmission channel allocated to the voice signal call becomes high, only the AND gate, or AND gates, corresponding to the transmission channel allocated to the voice signal call is open. Therefore, each signal VD from the voice signal processors is multiplexed by using the OR gate 88.

The data signal to be transmitted in packet mode is applied to an idle one of the packetizing circuits $24_1$ to $24_m$ by the switching circuit 33 after being converted to digital data. The data signals are packetized in the packetizing circuits and are set to a buffer memory 90, which is controlled by a memory control circuit 91. The memory control circuit 91 controls the packetizing circuits $24_1$ to $24_m$ in such a way that the data signals packetized in the packetizng circuits are never output therefrom simultaneously, and it also controls the buffer memory 90 so as to store the signals from these packetizing circuits and to read out the stored signals during a time slot to which no voice signal is allocated.

Figures 13, 13A:
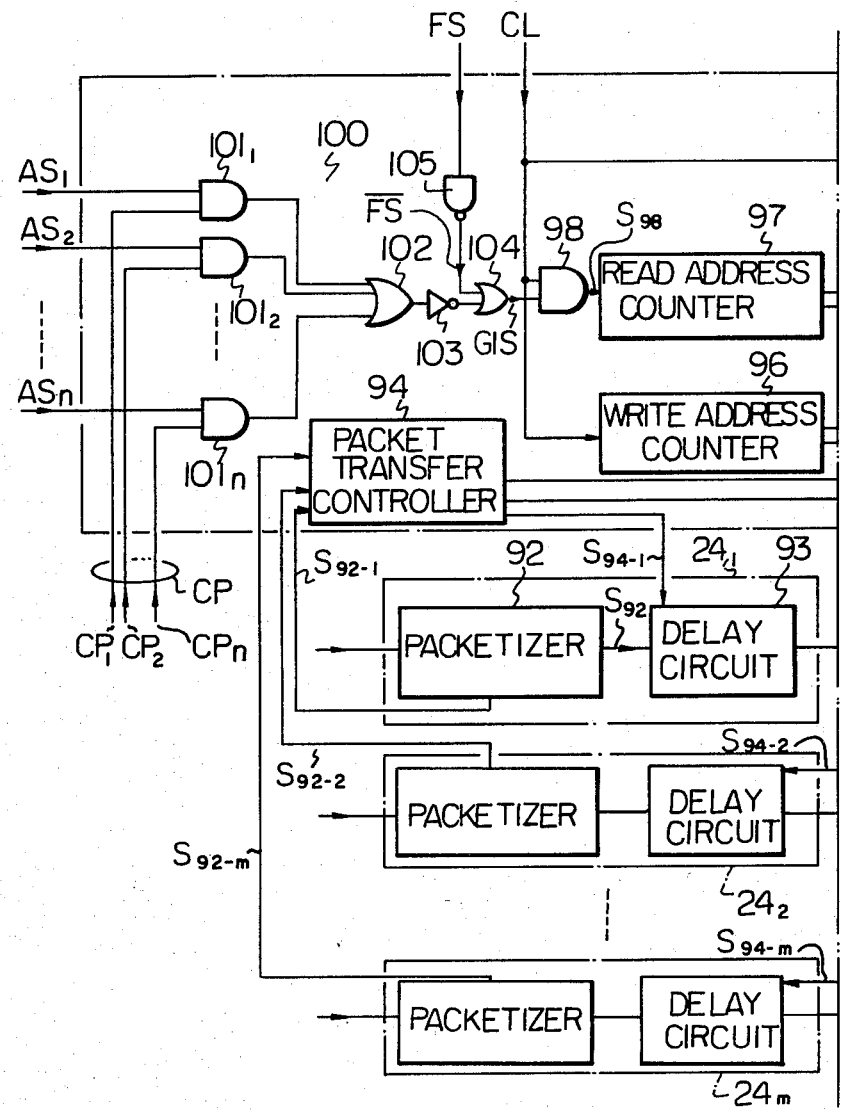
FIG. 13 (together with 13A and 13B) is a block diagram illustrating in more detail a memory control circuit and a packetizing circuit of FIG. 2.
Figure 13B:
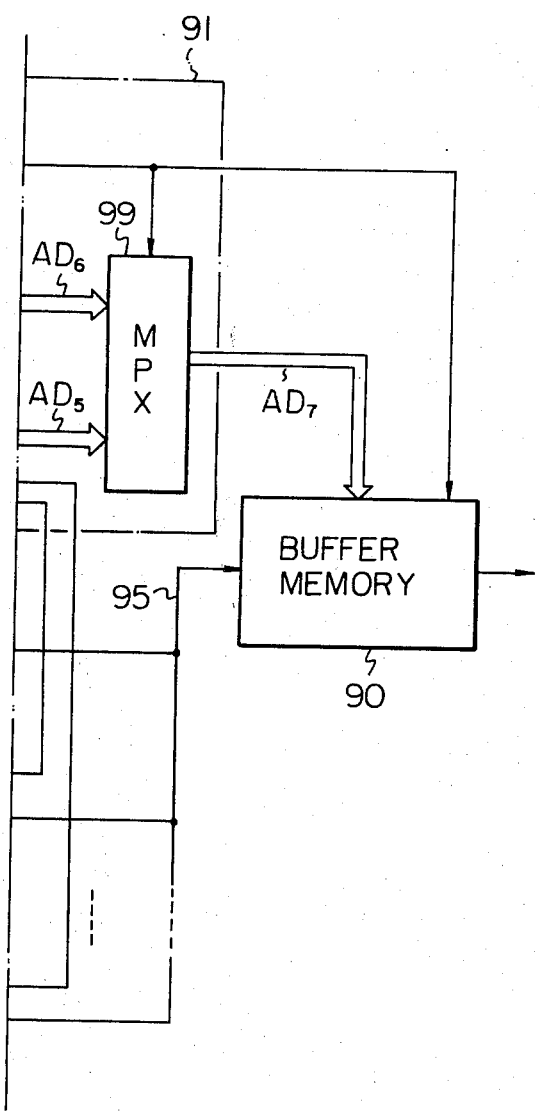

In FIG. 13, the packetizing circuits $24_1$, $24_2$, ..., the memory control circuit 91 and the buffer memory 90 are illustrated in more detail. The packetizing circuit $24_1$ comprises a packetizer 92 and a delay circuit 93. The packetizer 92 packetizes the data signal coming from the switching circuit 33, and the packetized data signal $S_{92}$ from the packetizer 92 is delayed in the delay circuit 93 by a predetermined time. The packetizing circuits other than the packetizing circuit $24_1$ are also constructed as described above. In order to avoid the packetizing signals from the circuits $24_1$ to $24_m$ being output simultaneously, the memory control circuit 91 has a packet transfer controller 94 to which signals $S_{92\text{-}1}$ to $S_{92\text{-}m}$ from the packetizers are applied. Each of the signals $S_{91\text{-}1}$ to $S_{92\text{-}m}$ are output at the time the packet with a predetermined length is established in the packetizer corresponding thereto, and the packet transfer controller 94 produces a set of delay control signals $S_{94\text{-}1}$ to $S_{94\text{-}m}$, which are applied to the delay circuits of the packetizing circuit $24_1$ to $24_m$ to control the delay time of each delay circuit. As a result, the data packeted in each packetizing circuit is derived from each packetizing circuit without overlap, and the data appearing on the line 95, as described above, is stored in the buffer memory 90. The packet transfer controller 94 is the same as that normally used in the conventional packet transmission devices.

The memory control circuit 91 has a write address counter 96, to which the clock pulse signal CL is applied as a count signal, and a read address counter 97, to which the clock pulse signal CL is applied through an AND gate 98 as a count signal. The counters 96 and 97 produce counted data $AD_5$ and $AD_6$ which are applied to a multiplexer 99. The clock pulse signal CL is also applied to the multiplexer 99 as a switching control signal. The multiplexer 99 is operated in such a way that the data $AD_6$ is derived therefrom as address data $AD_7$ when the signal CL is high, and the data $AD_5$ is derived therefrom as the address data $AD_7$ when the signal CL is low. Also, the clock pulse signal CL is applied to the buffer memory 90 as a write control signal. The buffer memory 90 is controlled is by the signal CL in such a way that the stored packet data is read-out in accordance with the counting data $AD_6$ when the signal CL is high and the applied packet data on the line 95 is stored in accordance with the counting data $AD_7$ when the signal CL is low. In order to stop reading out the stored packet data from the buffer memory 90 during the time slot occupied by a voice signal and the time slot for the frame synchronization pulses, a gate inhibit signal GIS is applied to the input terminal of the AND gate 98. The gate inhibit signal GIS is produced by a logic circuit 100 composed of AND gate $101_1$ to $101_n$ and an OR gate 102. One of the input terminals of the AND gates $101_1$ to $101_n$ receives the allocation status signals $AS_1$ to $AS_n$, respectively, and the signals $CP_1$ to $CP_n$ are applied to the other input terminals of the AND gates $101_1$ to $101_n$, respectively. The outputs from these AND gates $101_1$ to $101_n$ are applied to the n input terminals of the OR gate 102, respectively, and the output from the OR gate 102 is inverted by an inverter 103. The output from the inverter 103 is applied to one input terminal of an OR gate 104, to the other input terminal of which the inverted frame synchronization signal $\overline{FS}$ from a NAND gate 105 is applied. Therefore, since the level of the signal GIS becomes low for the time slot corresponding to the transmission channel allocated to the voice signal and for a time slot of frame synchronization pulses of the signal FS, the AND gate 98 does not permit the clock pulse signal CL to pass through when the above described signal VD is derived from the OR gate 88. In other words, the stored packet data in buffer memory 90 is read out by using the signal GIS during the time slot corresponding to the transmission channel to which no voice signal is allocated and the time slot for the frame synchronization signal.

As illustrated in FIG. 2, the associated signal from the OR gate 88, the data from the buffer memory 90 and the frame synchronization signal FS are applied to the OR gate 89, so that these signals are associated in series to compose a multiplex transmission signal which is sent to the station 3 through a transmission line 7.

As described above, a voice signal call originated in any of the telephone sets $4_1$ to $4_{24}$ is allocated to one of the predetermined n transmission channels in every frame, and after this, by using this allocated transmission channel, the cell is transmitted by the circuit switching system until the call is disconnected from the input channel. In this embodiment, the number of the transmission channels for allocation to voice signal calls is n, and the voice signal processors are provided in such a way that the number of the voice signal processors is equal to the maximum number of the transmission channels. However, it is not always necessary to provide n voice signal processors. Therefore, it is sometimes enough to provide a number of voice signal processors which is less than n. On the other hand, the data signals other than the voice signal are transmitted in the mode of the conventional packet transmission system by using any time slot except the time slot allocated for the voice signal call and the frame synchronization pulses.

In this specification, a data signal to which a special transmission delay characteristic is not required, is referred to as the data signal.

Since the transmission channel for a voice signal is prepared and occupied by a voice signal every time a voice signal call is originated in any telephone set and the transmission channel for the voice signal is released from the occupation when the voice signal call is disconnected from the input terminal, the permanent reservation of a predetermined number of transmission channels for voice signal calls is avoided.

Next, the receiving device 8 for receiving the signal from the OR gate 89 will be explained.

Figures 14, 14A:
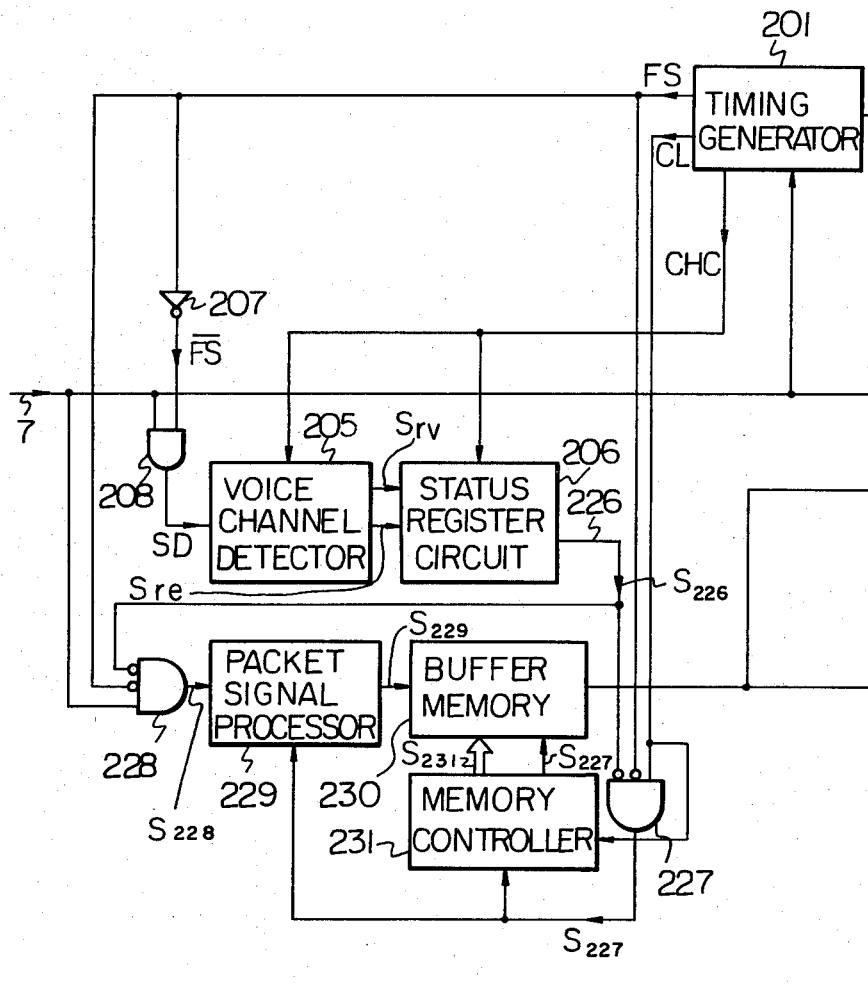
FIG. 14 (together with 14A and 14B) is a block diagram of a receiving device in FIG. 1.
Figure 14B:
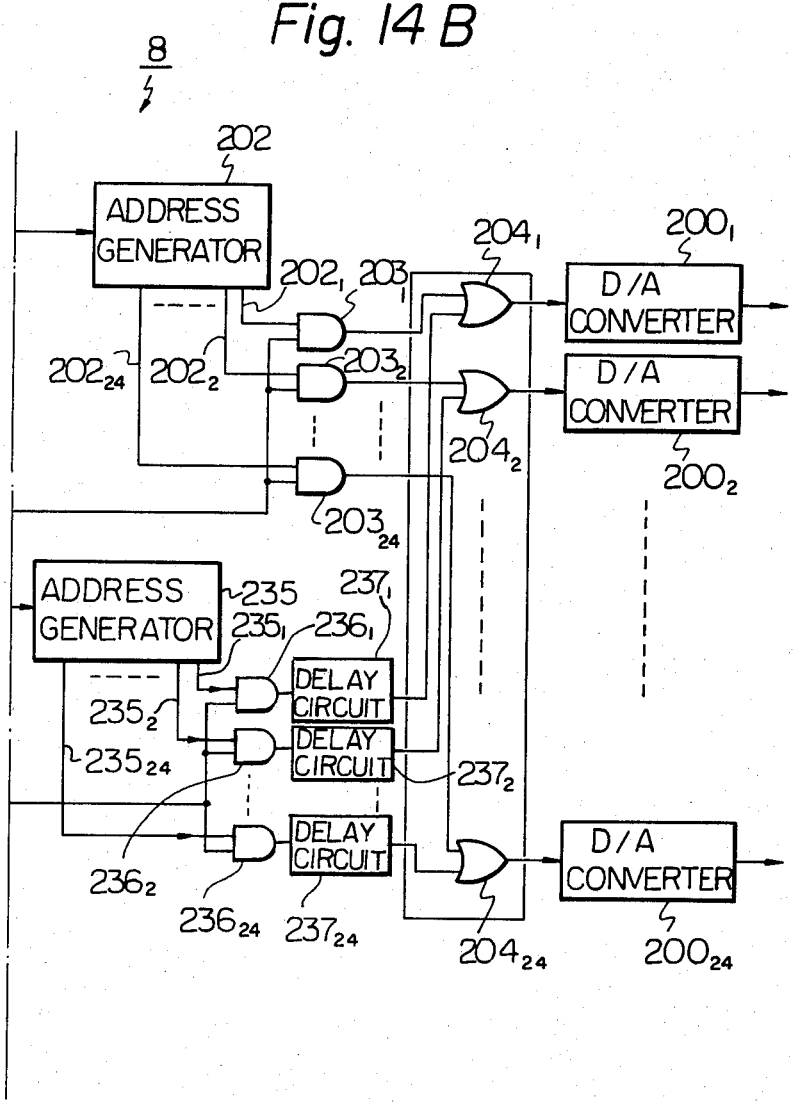

FIG. 14 is a block diagram of the receiving device 8, which operates so as to separate the signals multiplied by the transmitting device 6 and to connect to necessary D/A converters $200_1$ to $200_{24}$ the separated signals. The receiving device 8 has a timing generator 201 to extract the frame synchronization pulse signal FS contained in the multiplexed transmission signal given as input from the transmission line 7 for producing a frame synchronizing pulse signal that synchronizes with the transmitter. The timing generator 201 has the input connected to the transmission line 7 and has, besides the function of generating the above-mentioned frame synchronization pulse signal FS, a function of producing a clock pulse signal CL and a channel clock signal CHC, which are synchronized with the signals CL and CHC produced in the transmitting device 6, respectively. The timing generator also has the function of decoding the address bits of the voice signals of the multiplex transmitted signal supplied as input through the transmission line 7, in case of the embodiment illustrated in FIG. 2. The decoded information is fed into an address generator 202. The address generator 202 has twenty-four output lines $202_1$ to $202_{44}$, which correspond to the output channels 1 to 24, respectively, and each of these output lines are connected to one of the inputs of each of the AND gates $203_1$ to $203_{24}$. The other input of each of these AND gates is connected to the transmission line 7, and the level of only the output line of the address generator 202 becomes high in accordance with the decoded information of the timing generator 201. Therefore, the voice signals are distributed to the desired D/A converters through OR gates $204_1$ to $204_{24}$ by the address generator 202.

The receiving device 8 also has a voice channel detector 205, for detecting the transmission channel to which the voice signal is connected or from which the voice signal is disconnected. When the voice signal is allocated to any transmission channel, a reserve signal $S_{rv}$ is produced and is applied to a status register 206 in which the transmission channels used for voice signals are stored. When the voice signal is disconnected from some transmission channel, a release signal $S_{re}$ is produced and is applied to the status register 206. To carry out this operation, the multiplex transmission signal on the line 7 and the inverted frame synchronization pulse signal $\overline{FS}$ from an inverter 207 are applied to the input terminals of an AND gate 208 and the signal SD, in which the frame synchronization pulse signal FS is eliminated from the multiplex transmission signal on the line 7, is obtained from the AND gate 208. Then, the signal SD is applied to the voice channel detector 205.

Figures 15, 15A:
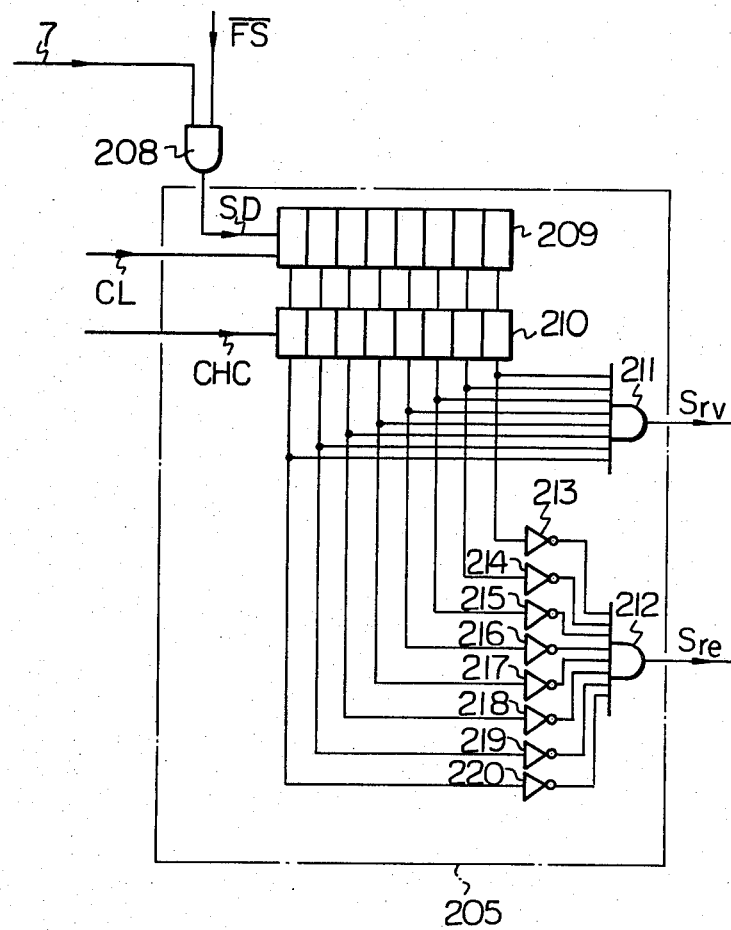
FIG. 15 (together with 15A & 15B) is a block diagram illustrating in detail a voice channel detector and a status resistor circuit of FIG. 14.
Figure 15B:
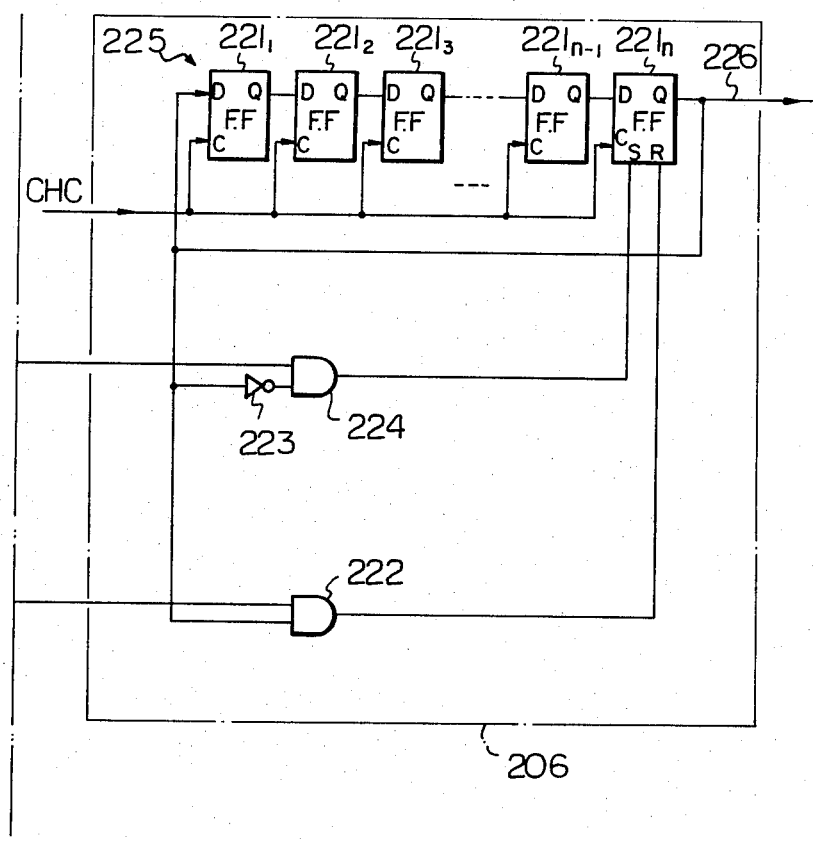

In FIG. 15, the voice channel detector 205 and the status register 206 are illustrated in more detail. The voice channel detector 205 has an 8-bit shift register 209, to which the signal SD is applied as data signal and the signal CL is applied as shift clock pulses. The 8-bit data stored in the shift register 209 is applied in parallel to an 8-bit register 210, to which the signal CHC from the timing generator 201 is supplied as latch pulses. The incoming 8-bit parallel data from the shift register 209 is stored every time the level of the signal CHC goes from high to low. The 8-bit parallel data derived from the register 210 is applied to the input terminals of an AND gate 211, respectively, and at the same time, is respectively applied to the input terminals of an AND gate 212 after each bit of the 8-bit parallel data is inverted by the inverters 213 to 220. Therefore, only when the 8-bit data from the register 210 is $(11111111)_2$, does the output level of the AND gate 211 become high, and only when the 8-bit data from the register 210 is $(00000000)_2$, does the output level of the AND gate 212 become high. As a result, since the pre-code signal $S_{85}$, inserted by using the pre-code generator 85, and the post-code signal $S_{86}$, inserted by using the post-code generator 86, are easily detected by the voice channel detector 205, the fact that a voice signal call is allocated to some transmission channel can be detected from the level status of the AND gate 211 and the fact that a voice signal call is disconnected from some input channel can be detected from the level status of the AND gate 212.

The status register circuit 206 has D-type flip flops $221_1$ to $221_n$, which are connected in series to construct a shift register 225. To shift the data in these flip flops, the channel clock signal CHC from the timing generator 201 is applied to each clock terminal C of the flip flops $221_1$ to $221_n$, each of which is a leading-edge trigger type flip flop. The Q output of the flip flop $221_{24}$ is applied to the D input of the flip flop $221_1$ in such a way that the shift register 224 acts as a cyclic shift register. The Q output from the flip flop $221_n$ is also applied to one input terminal of an AND gate 222 and to an inverter 223, the output of which is applied to one input terminal of an AND gate 224. The output from the AND gate 211 is applied to the other input terminal of the AND gate 224, and the output of the AND gate 224 is connected to a set terminal S of the flip flop $221_n$. The output from the AND gate 212 is applied to the other input terminal of the AND gate 222, the output of which is connected to a reset terminal R of the flip flop $221_n$.

Next, the operation of the detector 205 and the circuit 206 will be explained by means of a concrete example. In the shift register 225, n data bits are cyclically shifted and the logical status of the n data bits represents an allocated status in each transmission channel. The data bit becomes "1" when the corresponding transmission channel has been allocated to a voice signal call, and the data bit becomes "0" when the corresponding transmission channel is not allocated to a voice signal call. Assuming that the voice signal call is allocated to the transmission signal $TCH_1$ and the data for the channel TCH$_1$ in the shift register 225 is shifted from the flip flop 221$_{n-1}$ to the flip flop 221$_n$ at the time the level of the signal CHC goes from low to high, then the Q output of the flip flop 221$_n$ is low so that one input terminal of the AND gate 224 is high. At this time, since the data of channel TCH$_1$ is transmitted on the line 7, the pre-code signal S$_{85}$ is applied to the shift registor 209 as the signal SD in response to the allocation of that voice signal. Therefore, the pre-code signal S$_{85}$ is stored in the register 210 at the time the level of the signal CHC goes from high to low, and the output of the AND gate 211 becomes high. As a result, the flip flop 221$_{24}$ is set so that the Q output thereof becomes high. After this, whenever the line 7 is occupied by the transmission channel TCH$_1$ again, the Q output of the flip flop 221$_n$ becomes high, since the data in the shift register 225 is always returned to the same position by the application of n pulses of the signal CHC. As will be understood from above description, the level of line 226 becomes high whenever the transmission line 7 is assigned for the transmission channels which are allocated to the voice signals. On the other hand, since the post-code signal S$_{86}$ is stored in the register 210 when the voice signal call is disconnected from the input channel, the output level of the AND gate 212 becomes high and the flip flop 211$_n$ is reset due to high level condition of the line 226. As a result, the data written in the shift register 225 in response to receiving the pre-code signal is cleared by the receipt of the post-code signal which is sent by using the same transmission channel that is used for the above-mentioned post-code signal. Therefore, by monitoring the level of the line 226, detection of whether or not the transmission channel is allocated to any voice signals, is performed.

Referring back to FIG. 14, the output from the status register circuit 206 is applied to one input terminal of a gate 227, to the other input terminals of which the signals FS and CL are applied. Therefore, the clock pulse signal CL is permitted to pass through the gate 227 only when the signal FS is in a low level condition and the level at the line 226 is low. The signal S$_{227}$ from the gate 227 is supplied to a packet signal processor 229 and a memory controller 231. The signals FS and the signal from the status register circuit 206 are applied to input terminals of a gate 228, one inut terminal of which is connected to the line 7. Therefore, the gate 228 permits the signal on the line 7 to pass through only when the signal FS is in low level condition and the signal appearing on the line 226 is low. That is, the signal, except for the frame synchronization pulses and the voice signal, is supplied to the packet signal processor 229. The signal S$_{228}$ from the gate 228 is processed in the processor 229 so as to change packet data in the signal S$_{228}$ into the unpacketized digital data in the same manner as in the conventional packet transmission system. The signal S$_{229}$ from the packet signal processor 229 is applied to buffer memory 230, which is controlled by the signals S$_{231}$, S$_{227}$ and CL. The signal S$_{231}$ is address data for designating the address of the buffer memory 230, and the signal S$_{231}$ is produced from the memory controller 231.

Figure 16:
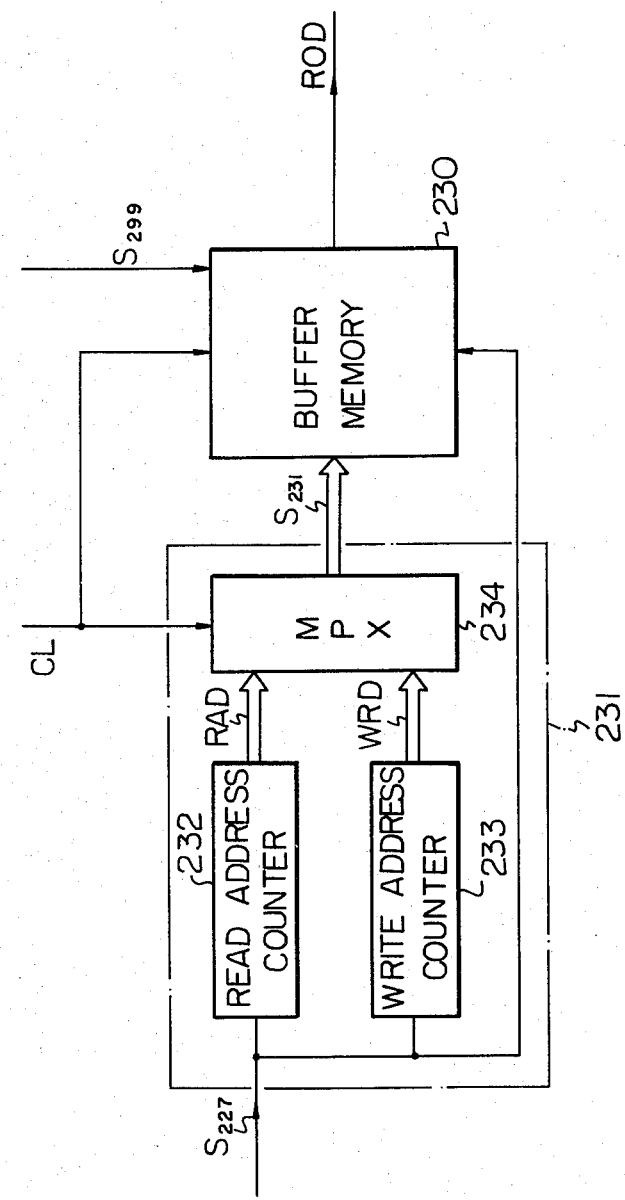
FIG. 16 is a detailed block diagram of a memory controller and a buffer memory in FIG. 14.

In FIG. 16, the buffer memory 230 and the memory controller 231 are illustrated in detail. The memory controller 231 has a read address counter 232, a write address counter 233 and a multiplexer 234. The signal S$_{227}$ is applied to the counters 232 and 233 as count pulses. The multiplexer 234 outputs either an address data RAD from the counter 232 or an address data WRD from the counter 233 as the signal S$_{231}$. This selective output operation is carried out by the application of the signal CL, which is also applied to the buffer memory 230 as a write pulse. When the signal CL is high, the multiplexer 234 derives the address data WRD as the signal S$_{231}$ and the memory 230 operates so as to store the signal S$_{299}$ in accordance with the designation of the signal S$_{231}$. When the signal CL is low, the multiplexer 234 derives the address data RAD as the signal S$_{231}$ and the memory 230 operates so as to read out the data stored in the address designated by the address data RAD. The signal S$_{227}$ is applied to buffer memory 230 to control the read/write operation. That is, when the gate 227 is closed, the buffer memory 230 is caused to stop any operation due to the fact that the clock pulses are not supplied to the memory 230.

A read-out data ROD from the memory 230 is supplied to an address generator 235 and one of the input terminals of AND gates 236$_1$ to 236$_{24}$. The address generator 235 has twenty-four output lines 235$_1$ to 235$_{24}$, which correspond to the twenty-four output channels 1 to 24, respectively, and each of these output lines are connected to each of the other input terminals of the AND gates 236$_1$ to 236$_{24}$. The address generator 235 has a function of decoding the output channel information contained in the data from the memory 230, and only the output line or lines of the address generator 235 becomes high in accordance with the decoded information. Therefore, the data signals from the memory 230 are distributed to the D/A converters through the Delay circuits 237$_1$ to 237$_{24}$ and the OR gates 204$_1$ to 204$_{24}$, in accordance with the output from the address generator 202.

The operation of the embodiment of the packet transmission system will now be explained.

Assuming that the signal S$_8$ is the voice signal which is allocated to the transmission channel TCH$_2$, and no voice signals are allocated to the other transmission channels TCH$_1$, TCH$_3$, TCH$_4$, . . . , then the signal GIS (FIG. 13) will become as indicated in FIG. 17A. The output signal S$_{98}$ from the AND gate 98 will, therefore, be as indicated in FIG. 17B. For this reason, the contents of the buffer memory 90, namely, packeted data signals, are read out by means of this signal S$_{98}$ during the time slots in which there are no voice signal and frame synchronization pulse signal, and the voice signal and data signals are multiplexed so as to give priority to the transmission channel assigned to the voice signal. The multiplexed signal format is illustrated in FIG. 17C.

If the voice signals VD$_a$ and VD$_b$, and data signals PS$_a$ to PS$_c$, as illustrated in FIG. 18, are supplied as inputs to the transmitting device 6 composed as described above, the voice signals VD$_a$ and VD$_b$ are assigned to the idle transmitting channels (TCH$_1$ and TCH$_2$ in case of the example in FIG. 18) corresponding to their input timing and connected to voice signal processors by means of the switching circuit 33, as described before. The data signals, PS$_a$ to PS$_c$ are connected to idle ones of the packetizing circuits also by means of the switching circuit 33. The data signals are given the necessary delay time through the delay circuit in their respective packetizing circuits and are sequentially fed into the buffer memory 90. In case of the example in FIG. 18, signals PS$_a$ and PS$_b$ partially overlap each other; therefore, the signal PS$_b$ will be delayed by time t$_k$ and then fed in the buffer memory 90. The voice data signals VD$_a$ and VD$_b$ are given no time delay and are transmitted unchanged by using the channels TCH$_1$ and TCH$_2$, respectively. The data signals PS$_a$, $PS_b$ and $PS_c$ are transmitted by using the channels $TCH_3$, $TCH_4$ and $TCH_6$, respectively. Hence, the signals are multiplexed according to the data format illustrated in FIG. 18F to be sent to the transmission line 7.

Therefore, when the multiplexed signal described above is received in the receiving device 8, the status signal $S_{226}$ appearing on the line 226 is low in the portion of the time slots corresponding to the transmission channels $TCH_1$ and $TCH_2$ and is high in the other time slots.

Figure 19A:
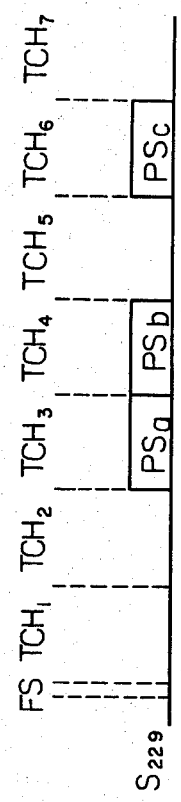
FIGS. 19A to 19C are timing charts for explaining the operation of the receiving device.
Figure 19B:
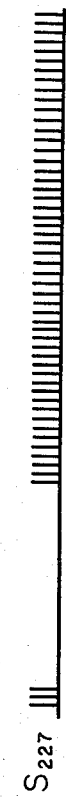
Figure 19C:
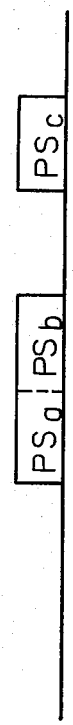

As a result, the multiplex signal from which the frame synchronization pulse signal FS and the voice signals are eliminated is applied as an input to a packet signal processor 229. For discriminating the packet of data signals from the voice signals, the packet signal processor 229 detects the identification code (for example $(01111110)_2$) attached to the packet of data signals, extracts only the packets provided with this identification code, and feeds them to the buffer memory 230. Therefore, the output signal $S_{229}$ of the packet signal processor 229 will be as indicated in FIG. 19A. The data written in the buffer memory 230 are continuously read out by means of the read pulse signal $S_{227}$ from the memory controller 231 (shown in FIG. 19B) and are distributed as described before. Therefore, in the case of the example in FIG. 19, signals $PS_a$, $PS_b$ and $PS_c$ will be obtained from the AND gates without any overlapping of the signals as illustrated in FIG. 19C.

The packet transmission system composed as described above achieves a very high transmission efficiency. That is because voice signals and data signals are arbitrarily fed into the transmitting device, the voice signals whose permissible value of time delay is small are assigned with priority to appropriate transmission channels in one frame and sent to the receiving device. The data signals with which time delay is allowable to a certain extent are assigned to the time slots other than the channels assigned to the voice signals for combining into a multiplex transmission signal. Therefore, required transmission quality can always be maintained for the transmission of the voice signals. The data signals are, in contrast to the conventional system in which exclusive channels are provided beforehand, assigned to idle channels if there are few voice signals. As a result, even in the case where a mixture of voice and data signals are transmitted the transmission efficiency will not be lower than that of the conventional system.

What is claimed is:

1. A packet transmission system, having a clearing signal input and a call origination signal input, for packetizing and transmitting telephone signals, including voice signals and data signals, said telephone signals being transmitted in transmission frames, comprising:
   a connecting means for allocating each of the voice signals to a predetermined address in each of the transmission frames, and for causing said each of the voice signals to occupy the predetermined address after a particular call-origination signal which indicates the presence of said voice signal is detected; and
   a releasing means, operatively connected to said connecting means, for releasing said predetermined address from occupied status when a clearing signal, which indicates clearing of said voice signal is detected.

2. A packet transmission system for packetizing and transmitting telephone signals, including voice signals and data signals, said telephone signals being transmitted in transmission frames, comprising:
   a detecting means for discriminating the kind of incoming telephone signal at each input channel;
   processing means, operatively connected to said detecting means, for processing said incoming telephone signal in dependence upon the kind of said incoming telephone signal which is discriminated by said detecting means, and for packetizing each of the data signals; and
   multiplexing means, operatively connected to said processing means, for allocating each of the voice processing means to a predetermined address in each of the transmission frames, and for causing each of the voice signals to occupy said predetermined address prior to the allocation of one of the signals, and for allocating each of the data signals packetized by said processing means to an address which is not occupied by one of the voice signals, whereby the incoming telephone signals including the data signals and the voice signals are multiplexed.

3. A packet transmission system as set forth in claim 2, wherein said processing means comprises a plurality of voice signal processors for processing the voice signals, a plurality of packetizing circuits for packetizing the data signals, and a switching circuit, operatively connected to said plurality of voice signal processors, said plurality of packetizing circuits, and said detecting means, for selectively applying the incoming telephone signals to be processed to one of said plurality of voice signal processors or one of said plurality of packetizing circuits in dependence upon the discrimination of said detecting means.

4. A packet transmission system as set forth in claim 2, wherein said detecting means comprises a signal detector, operatively connected to receive said incoming telephone signals, for discriminating whether or not the incoming telephone signal is one of the voice signals; an occupying status detector, operatively connected to said signal detector, for storing the result of the discrimination by said signal detector; and a connecting control circuit, operatively connected between said occupying status detector and said processing means, for producing data representing the relationship between an input channel of said one of the voice signals and an address to which one of the voice signals is allocated.

5. A packet transmission system as set forth in claim 2, wherein said multiplexing means comprises a buffer memory, operatively connected to said processing means, for temporarily storing the packetized data signals, and a memory control circuit, operatively connected to said buffer memory and said detector means, for controlling the read-out operation of said buffer memory in such a way that the contents of said buffer memory are allocated to addresses in the transmission frames to which none of the voice signals is allocated.

6. A packet transmission system as set forth in claim 4, wherein said connecting control circuit comprises a selecting circuit for selecting an idle address in each of the transmission frames for the allocation of one of the voice signals when said one of the voice signals is originated; an allocation memory, operatively connected to said selecting circuit, for storing the relationship between an input channel of said one of the voice signals and an address to which said one of the voice signals is allocated; writing means, operatively connected to said selecting circuit, for writing the address to which said one of the voice signals has been allocated in dependence upon information from said selecting circuit; and an erasing circuit for erasing the information corresponding to said one of the voice signals when said one of the voice signals is over.

7. A packet transmission system as set forth in claims 2 or 4, wherein a particular code is added to each of the voice signals so as to distinguish between one of the voice signals and one of the data signals, and so that said detecting means discriminates the voice signals by detecting said particular code.

8. A packet transmission system, for packetizing and transmitting in transmission frames telephone signals, received on a plurality of input channels, said telephone signals including voice signals and data signals, comprising:
   a plurality of analog to digital converters, each of which is operatively connected to one of the plurality of input channels, for receiving the telephone signals and for providing a corresponding digital telephone output signal;
   a signal detector, operatively connected to the plurality of input channels, for receiving the telephone signals and for determining if one or more of the telephone signals are voice signals and for providing a signal detector output signal;
   an occupying status detector, operatively connected to said signal detector, for storing said signal detector output signal and for providing as outputs status change signals and input channel status signals;
   a connecting control circuit, operatively connected to said occupying status detector, for producing allocation status signals representing the relationship between the input channel of each of the voice signals and an address to which said each of the voice signals is allocated;
   a switching circuit, operatively connected to said plurality of analog to digital converters and to said connecting control circuit, for providing voice signal outputs and data signal outputs;
   a plurality of voice signal processors, operatively connected to said switching circuit, for processing said voice signal outputs;
   a plurality of packetizing circuits, operatively connected to said switching circuit, for packetizing said data signal outputs;
   a buffer memory, operatively connected to said plurality of packetizing circuits, for temporarily storing the packetized data signal outputs;
   a memory control circuit, operatively connected between said buffer memory and said connecting control circuit, for controlling the read-out of the packetized data signal outputs from said buffer memory in dependence upon said status allocation signal, whereby the packetized data signal outputs are allocated to addresses in each of the transmission frames to which none of the voice signal outputs has been allocated.

9. A packet transmission system as set forth in claim 8, wherein said connecting control circuit comprises:
   a first code converter, operatively connected to said occupying status detector, for receiving said input channel status signals and for producing a digital input channel signal;
   a random access memory, operatively connected to said first code converter, for storing said digital input channel signal and for reading out said digital input channel signal in dependence upon said status change signals;
   a flip flop array, operatively connected to said first code converter, for storing said digital input channel signal in dependence upon said status change signal;
   a multiplexer circuit, operatively connected to said random access memory, for providing address data to said random access memory;
   a status register, operatively connected to said occupying status detector, for receiving said status change signals and for providing an output consisting of said allocation status signals;
   a second code converter, operatively connected between said status register and said multiplexer circuit, for converting said allocation status signals into an allocation binary data signal and for providing said allocation binary data signal to said multiplexer circuit;
   a third code converter, operatively connected to said second code converter and said status register, for receiving said allocation binary data signal and for providing a level output signal to said status registers.

10. A packet transmission system as set forth in claim 9, wherein said memory control circuit is operatively connected to a means for generating a clock pulse signal and wherein said memory control circuit comprises:
    a packet transfer controller, operatively connected to said plurality of packetizing circuits, for producing delay control signals to control the delay time of each of said plurality of packetizing circuits;
    a read address counter, operatively connected to the means for generating the clock pulse signal and operatively connected to said status register, for receiving said allocation status signals and for providing a first counter data signal when the clock pulse signal is high;
    a write address counter, operatively connected to the means for generating the clock pulse signal, for providing a second counted data signal when the clock pulse signal is low;
    a buffer multiplexer circuit, operatively connected to the means for generating the clock pulse signal and operatively connected to said read address counter, said write address counter and said buffer memory, for outputting said first counted data signal when the clock pulse signal is high and for outputting said second counted data signal when the clock pulse signal is low.

11. A packet transmission system as set forth in claim 10, wherein said buffer memory is operatively connected to the means for generating the clock pulse signal and wherein said buffer memory reads out said packetized data signal outputs in dependence upon said first counted data signal when the clock pulse signal is high, and wherein said buffer memory stores said packetized data signal outputs in dependence upon said second counted data signal when the clock pulse signal is low.

* * * * *

UNITED STATES PATENT AND TRADEMARK OFFICE
CERTIFICATE OF CORRECTION

PATENT NO. : 4,238,851   Page 1 of 2

DATED : December 9, 1980

INVENTOR(S) : Takahashi et al

It is certified that error appears in the above—identified patent and that said Letters Patent is hereby corrected as shown below:

Front page, [73], Assignee: "KawasAki" should be --Kawasaki--;
    [57], Atstract: line 9, after "call" delete ",".
Column 1, line 52, "paticular" should be --particular--.
Column 2, lines 17, 29, 39, 42, 44, "together with" should be --including--.
Column 3, line 18, "deley" should be --delay--;
    line 23, "paticular" should be --particular--.
Column 5, line 29, "$SCS_2SCS_3$" should be --$SCS_2$ and $SCS_3$--.
Column 6, line 29, after "FS." delete "p" and begin new paragraph with "Referring ...".
Column 7, line 10, "$AS_\ell$" should be --$AS_1$--;
    line 25, "$56_\ell$" (both occurrences) should be --$56_1$--;
    line 27, "$46_\ell$" should be --$46_1$--;
    lines 37 and 41, "$46_\ell$" should be --$46_1$--;
    line 38, "$55_\ell$" should be --$55_1$--.
Column 8, line 15, "is" should be --are--;
    line 29, after "of" insert --each of--;
    line 30, "are" should be --is--;
    line 62, "s" should be --is--.
Column 9, line 6, "proses-" should be -proces- --;

UNITED STATES PATENT AND TRADEMARK OFFICE
CERTIFICATE OF CORRECTION

PATENT NO. : 4,238,851

DATED : December 9, 1980

INVENTOR(S) : Takahashi et al

It is certified that error appears in the above—identified patent and that said Letters Patent is hereby corrected as shown below:

line 28, "terminal" should be --terminals--.
Column 10, line 13, "inverter" should be --inverters--.
Column 12, line 21, after "controlled" delete "is";
           line 66, "cell" should be --call--.
Column 13, line 27, "multiplied" should be --multiplexed--;
           line 50, "are" should be --is--.
Column 14, line 21, delete "respectively,".
Column 15, line 7, "registor" should be --register--;
           line 45, "inut" should be --input--.
Column 16, line 23, "are" should be --is--;
           line 31, "Delay" should be --delay--.
Column 20, line 22, after "circuit;" insert --and--;
           line 40, "counter" should be --counted--.

Signed and Sealed this

Twelfth Day of May 1981

[SEAL]

Attest:

RENE D. TEGTMEYER

Attesting Officer    Acting Commissioner of Patents and Trademarks